US009430916B2

(12) United States Patent
Rodgers et al.

(10) Patent No.: US 9,430,916 B2
(45) Date of Patent: Aug. 30, 2016

(54) GAMING DEVICE WITH WILD ACTIVATION SYMBOLS AND WILD TERMINATION SYMBOLS

(71) Applicant: IGT, Las Vegas, NV (US)

(72) Inventors: Paulina Rodgers, Reno, NV (US); Karen Cregan, Toongabbie (AU); Anthony J. Baerlocher, Henderson, NV (US); Joseph E. Kaminkow, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 14/591,598

(22) Filed: Jan. 7, 2015

(65) Prior Publication Data

US 2015/0126265 A1 May 7, 2015

Related U.S. Application Data

(63) Continuation of application No. 14/084,240, filed on Nov. 19, 2013, now Pat. No. 8,968,076, which is a continuation of application No. 11/211,238, filed on Aug. 25, 2005, now Pat. No. 8,591,310, which is a (Continued)

(51) Int. Cl.
*G06F 17/00* (2006.01)
*G06F 19/00* (2011.01)

(Continued)

(52) U.S. Cl.
CPC ........... *G07F 17/34* (2013.01); *G07F 17/3213* (2013.01); *G07F 17/3246* (2013.01); *G07F 17/3251* (2013.01); *G07F 17/3265* (2013.01); *G07F 17/3211* (2013.01)

(58) Field of Classification Search
CPC ............. G07F 17/326; G07F 17/3211; G07F 17/3265; G07F 17/3267
See application file for complete search history.

(56) References Cited

U.S. PATENT DOCUMENTS

| | | | | |
|---|---|---|---|---|
| 5,265,874 | A * | 11/1993 | Dickinson | A63F 3/081 463/25 |
| 5,308,065 | A | 5/1994 | Bridgeman et al. | |
| 5,332,228 | A | 7/1994 | Schultz | |

(Continued)

FOREIGN PATENT DOCUMENTS

| | | |
|---|---|---|
| AU | 199717601 B2 | 9/1997 |
| AU | WO 9732285 | 9/1997 |

(Continued)

OTHER PUBLICATIONS

The Basics of Winning Video Poker (Chapter VI Deuces Wild & Chapter VII Jokers Wild) written by J. Edward Allen, published in 1990.

(Continued)

*Primary Examiner* — Steven J Hylinski
(74) *Attorney, Agent, or Firm* — Neal, Gerber & Eisenberg LLP

(57) ABSTRACT

A gaming device having a wild activation symbol is displayed on a set of reels or set of cards within a display device. The processor causes other symbols or cards to become wild within the display device when the wild termination symbol is displayed. When the wild activation symbol is displayed, the present invention may also provide a wild termination symbol on the set of reels or the set of cards within a display device. The processor may then stop symbols or cards from becoming wild based on the position of the wild termination symbol.

11 Claims, 26 Drawing Sheets

Related U.S. Application Data continuation-in-part of application No. 10/966,223, filed on Oct. 15, 2004, now Pat. No. 7,699,696, which is a continuation of application No. 09/964,102, filed on Sep. 26, 2001, now Pat. No. 6,805,349.

(51) Int. Cl.

| | |
|---|---|
| ***G07F 17/34*** | (2006.01) |
| *G07F 17/32* | (2006.01) |

(56) References Cited

U.S. PATENT DOCUMENTS

| | | | | |
|---|---|---|---|---|
| 5,423,539 | A | 6/1995 | Nagao | |
| 5,431,408 | A | 7/1995 | Adams | |
| 5,449,173 | A | 9/1995 | Thomas et al. | |
| 5,772,506 | A | 6/1998 | Marks et al. | |
| 5,823,873 | A | 10/1998 | Moody | |
| 5,851,148 | A * | 12/1998 | Brune | A63F 1/18 463/25 |
| 5,882,261 | A | 3/1999 | Adams | |
| 5,980,384 | A | 11/1999 | Barrie | |
| 6,004,207 | A | 12/1999 | Wilson, Jr. et al. | |
| 6,012,832 | A * | 1/2000 | Saunders | G07F 17/32 235/375 |
| 6,059,289 | A | 5/2000 | Vancura | |
| 6,059,658 | A | 5/2000 | Mangano et al. | |
| 6,089,977 | A | 7/2000 | Bennett | |
| 6,117,009 | A | 9/2000 | Yoseloff | |
| 6,120,031 | A | 9/2000 | Adams | |
| 6,159,095 | A | 12/2000 | Frohm et al. | |
| 6,190,254 | B1 | 2/2001 | Bennett | |
| 6,190,255 | B1 | 2/2001 | Thomas et al. | |
| 6,220,959 | B1 | 4/2001 | Holmes, Jr. et al. | |
| 6,251,013 | B1 | 6/2001 | Bennett | |
| 6,290,600 | B1 * | 9/2001 | Glasson | G07F 17/3265 273/143 R |
| 6,299,165 | B1 | 10/2001 | Nagano | |
| 6,299,170 | B1 | 10/2001 | Yoseloff | |
| 6,302,398 | B1 | 10/2001 | Vecchio | |
| 6,311,976 | B1 | 11/2001 | Yoseloff et al. | |
| 6,322,078 | B1 | 11/2001 | Adams | |
| 6,358,144 | B1 | 3/2002 | Kaddlic et al. | |
| 6,419,579 | B1 | 7/2002 | Bennett | |
| 6,428,412 | B1 | 8/2002 | Anderson et al. | |
| 6,439,993 | B1 | 8/2002 | O'Halloran | |
| 6,439,995 | B1 | 8/2002 | Hughs-Baird et al. | |
| 6,454,266 | B1 | 9/2002 | Breeding et al. | |
| 6,494,454 | B2 | 12/2002 | Adams | |
| 6,517,432 | B1 * | 2/2003 | Jaffe | G07F 17/32 463/16 |
| 6,561,900 | B1 * | 5/2003 | Baerlocher | G07F 17/34 273/143 R |
| 6,786,818 | B1 | 9/2004 | Rothschild et al. | |
| 7,347,777 | B2 | 3/2008 | Gauselmann | |
| 8,419,524 | B2 | 4/2013 | Singer et al. | |
| 2005/0054418 | A1 | 3/2005 | Baerlocher | |

FOREIGN PATENT DOCUMENTS

| | | | |
|---|---|---|---|
| AU | 722969 | | 6/1998 |
| AU | 199917318 | A1 | 9/1999 |
| EP | 0984408 | A2 | 3/2000 |
| GB | 2 193 827 | A | 2/1988 |
| WO | WO 00/32286 | | 6/2000 |
| WO | WO 00/66235 | | 11/2000 |
| WO | WO 00/76606 | A1 | 12/2000 |

OTHER PUBLICATIONS

Black Swan Paytable Display written by IGT, published prior to 2001.

Boot Scootin Article written by Strictly Slots/Aristocrat Leisure Industries, PTY Ltd., published date unknown.

Break the Spell Article written by Strictly Slots/Atronic Casino Technology, Ltd., published in Sep. 2000.

Break the Spell Atronic Web Page, published in Jan. 2001.

Break the Spell Brochure, published in 1999.

Cash Chameleon Article written by Strictly Slots/Aristocrat Leisure Industries, PTY Ltd., published in Apr. 2001.

Cossack Dance Advertisement written by Olympic Video Gaming, published prior to 2002.

Description of Symbol Feature in Australian UFO Gaming Machine written by Barcrest Ltd., published in 1995.

Double Diamond Line Advertisement written by Bally Gaming Systems, published in 2000.

Enchanted Unicorn Advertisement written by IGT, published in 2001.

Enchanted Forest™ Gaming Description from Aristocrat, available in 1994.

Fishin' Buddies Article published in Strictly Slots/Anchor Games, published in Apr. 2001.

Introducing the "Smiling Ape" Machine Advertisement (including Joker's Wild Poker description) written by IGT, published prior to 2001.

Jackpot Party Brochure and Articles written by WMS Gaming, Inc, published in 1988.

Joker's Wild Advertisement written by IGT, published prior to 2001.

Little Green Men, Jr. Advertisement written by A.C. Coin and Slot Services Company, published prior to 2002.

Loco Loot Article written by Strictly Slots/Aristocrat Leisure Industries, PTY Ltd., published prior to May 2002.

Mountain Money Article written by Strictly Slots/Aristocrat Leisure Industries, PTY Ltd., published prior to Jun. 2002.

Penguin Pays Advertisement written by Aristocrat Incorporated, published in 1998.

Reel Magic™ Gaming Machine Description written by IGT, available in 1986.

Wild Streak Advertisement written by WMS Gaming, Inc., published in 2001.

Your Real Key to Gaming Success Advertisement (including Roll Over Beethoven and Wild Fortune) written by Olympic Video Gaming, published dated unknown.

Final Office Action dated Dec. 5, 2003 for U.S. Appl. No. 09/964,102 now U.S. Pat. No. 6,805,349.

Non-Final Office Action dated Jun. 5, 2003 for U.S. Appl. No. 09/964,102 now U.S. Pat. No. 6,805,349.

Non-Final Office Action dated Jul. 16, 2009 for U.S. Appl. No. 10/966,223 now U.S. Pat. No. 7,699,696.

* cited by examiner

GAMING DEVICE WITH WILD ACTIVATION SYMBOLS AND WILD TERMINATION SYMBOLS

PRIORITY CLAIM

This patent application is a continuation of, and claims priority to and the benefit of, U.S. patent application Ser. No. 14/084,240, filed on Nov. 19, 2013, which is a continuation of, and claims priority to and the benefit of, U.S. patent application Ser. No. 11/211,238, filed on Aug. 25, 2005, which issued as U.S. Pat. No. 8,591,310 on Nov. 26, 2013, which is a continuation-in-part of, and claims priority to and the benefit of, U.S. patent application Ser. No. 10/966,223, filed on Oct. 15, 2004, which issued as U.S. Pat. No. 7,699,696 on Apr. 20, 2010, which is a continuation of, and claims priority to and the benefit of, U.S. patent application Ser. No. 09/964,102, filed on Sep. 26, 2001, which issued as U.S. Pat. No. 6,805,349 on Oct. 19, 2004, the entire contents of each of which are incorporated herein by reference.

BACKGROUND

Gaming devices are well known. Many known gaming devices provide wild symbols or wild cards. Wild symbols provide a player with an additional opportunity to obtain winning combinations. The use of wild symbols, wild cards or wild indicators in gaming devices provide additional excitement and entertainment for players.

In a slot machine having reels, a wild symbol can enable the matching of symbols along a payline to achieve a combination. For example, in a three reel slot machine, the symbols along a payline on the first, second and third reels may be, respectively, a heart, a heart and a wild symbol. If, in the gaming scheme, the gaming device awards a player for a three heart combination, the wild symbol substitutes for a heart and provides the player with that combination.

In a video poker game, a wild symbol substitutes for a card. For example, in a five card draw poker gaming machine where the gaming device displays five cards, the cards can be a 10, Jack, Queen, King and wild card. The wild card substitutes as an Ace and provides the player with a winning combination.

Wild cards have been employed in gaming devices in other manners. For example, U.S. Pat. No. 5,431,408 discloses a gaming device having a video poker gaming scheme. A player is dealt a hand consisting of five cards. The player is also given a wild card. The wild card is separate from the dealt hand. The player can reserve the wild card for use with a subsequent hand. Thus, the player can use the wild card in a hand in which it is most advantageous to do so.

In another example, U.S. Pat. No. 6,089,977 discloses a gaming device having a roaming wild symbol. More specifically, the patent discloses a gaming device having a set of virtual reels. The reels display a set of symbols. Certain symbol combinations serve as triggering events. When one of these combinations occurs on the reels, a wild card symbol appears on the reels in the form of a graphical image and moves along the reels. As the wild card symbol moves from one symbol or location to adjacent symbols or locations, the symbols transform into the wild card symbol. After each move of the wild card symbol, the gaming device determines and pays the player for any winning combination which is the result of the transformation. When the wild card symbol moves to the next adjacent symbol, the symbol previously transformed reverts to its original state.

To increase player enjoyment and excitement, it is desirable to provide gaming devices having new and different wild symbol, wild indicator and wild card schemes.

SUMMARY

The present invention provides a gaming device including a set of reels. The reels include symbols. One of the symbols is a wild activation symbol. A player uses conventional control features to activate or spin the reels. If a wild activation symbol is displayed within a display device of the gaming device on an active payline, in a predetermined position, or in a predetermined position on an active payline, the processor causes the other displayed symbols to sequentially become wild. The processor can also cause the wild activation symbol to be wild. When a wild activation symbol occurs, the processor randomly selects one of the other displayed symbols to be a wild termination symbol. The processor sequentially causes the symbols to become wild until such wild termination symbol is reached. At this point, the processor stops any symbols from becoming wild at or beyond the position in which the wild termination symbol is displayed. It should be appreciated that the transformation process can be repeated one or more times as predetermined or as randomly determined by the processor.

In one embodiment, the gaming device provides a set of symbols on a set of reels. A plurality of the symbols are displayed by a display device. The processor determines which of the symbols will be the wild activation symbol and which of the symbols will be the wild termination symbol. The processor makes the determination when the reels are activated. The specific symbol may be chosen randomly or may be chosen in a predetermined manner. The wild activation symbol and wild termination symbol are not immediately distinguishable from the other symbols in the set of symbols. The processor sequentially transforms symbols displayed within the display device into wild symbols beginning with the wild symbol and ending with the wild termination symbol. Thus, the processor prevents the transformation of symbols into wild symbols beyond a certain position within the display device occupied by the wild termination symbol.

In one embodiment, one or both of the wild activation symbol and wild termination symbol are fixed or distinguished from the other symbols. In an example, the gaming device includes a set of reels having a plurality of symbols such as hearts, cherries, and other suitable symbols. The reels include at least one wild activation symbol. A player activates the reels using a control feature of the gaming device. A plurality of the symbols, including the wild activation symbol, are selectively displayed within the display device. The processor causes symbols within the display device to become wild sequentially. The symbols may become wild in a particular direction or in a random sequence. When the display device displays a wild activation symbol, the processor randomly determines which of the displayed symbols will be the wild termination symbol. The processor stops symbols from becoming wild beyond the position of the symbol which is determined to be the wild termination symbol.

It should also be appreciated that the reels could, in an alternative embodiment, include one or more fixed wild activation symbols and one or more fixed wild termination symbols on the reels. In this case, each set of wild activation symbols and wild termination symbols are independently utilized. The processor is also capable of causing only the wild activation symbol or the wild termination symbol on the reels. If a wild termination symbol is displayed by itself, it does not affect the outcome. If a wild activation symbol is displayed without a wild termination symbol, it causes one, a plurality, or all of the other symbols to become wild (i.e., without termination). If a wild activation symbol and a wild termination symbol are displayed, the symbols successively turn wild until reaching the wild termination symbol as described above.

In one further embodiment, the gaming device includes a plurality of symbol generators which include a plurality of symbols. The symbol generators are operable to generate the symbols at a plurality of symbol positions. The symbols include at least one or a plurality of wild activation symbols and at least one or a plurality of wild termination symbols. The gaming device includes at least one or a plurality of paths associated with the symbol generators. In one embodiment, the paths are paylines. Each payline includes a plurality of the symbol positions at which the symbols of the symbol generators can be generated. When the gaming device generates both a wild activation symbol and a wild termination symbol in the symbol positions of one of the paylines or paths, the symbols between the wild activation symbol and the wild termination symbol are transformed into wild symbols. In one embodiment, the transformation occurs simultaneously. In one embodiment, the gaming device transforms the symbols along the path or payline into wild symbols only for the evaluation of that payline (assuming that payline has been wagered on and is thus active) and then converts the symbols back into the originally generated symbols for the evaluation of any of the other active paylines. In one embodiment, only the symbols along the active payline or path that includes the wild activation and wild termination are transformed into wild symbols. In another embodiment, the gaming device evaluates all active paylines with the converted wild symbol or symbols. In one alternative embodiment, the transformation can occur sequentially for each symbol along the designated active path or payline and the payline may thus be evaluated more than one time. In alternative embodiments, the wild termination and/or wild activation symbols are also wild.

It should be appreciated that the present invention could be employed in other primary games, such as video poker as described below and in bonus or secondary games.

It is therefore an advantage of the present invention to provide a gaming device having wild activation symbols and wild termination symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
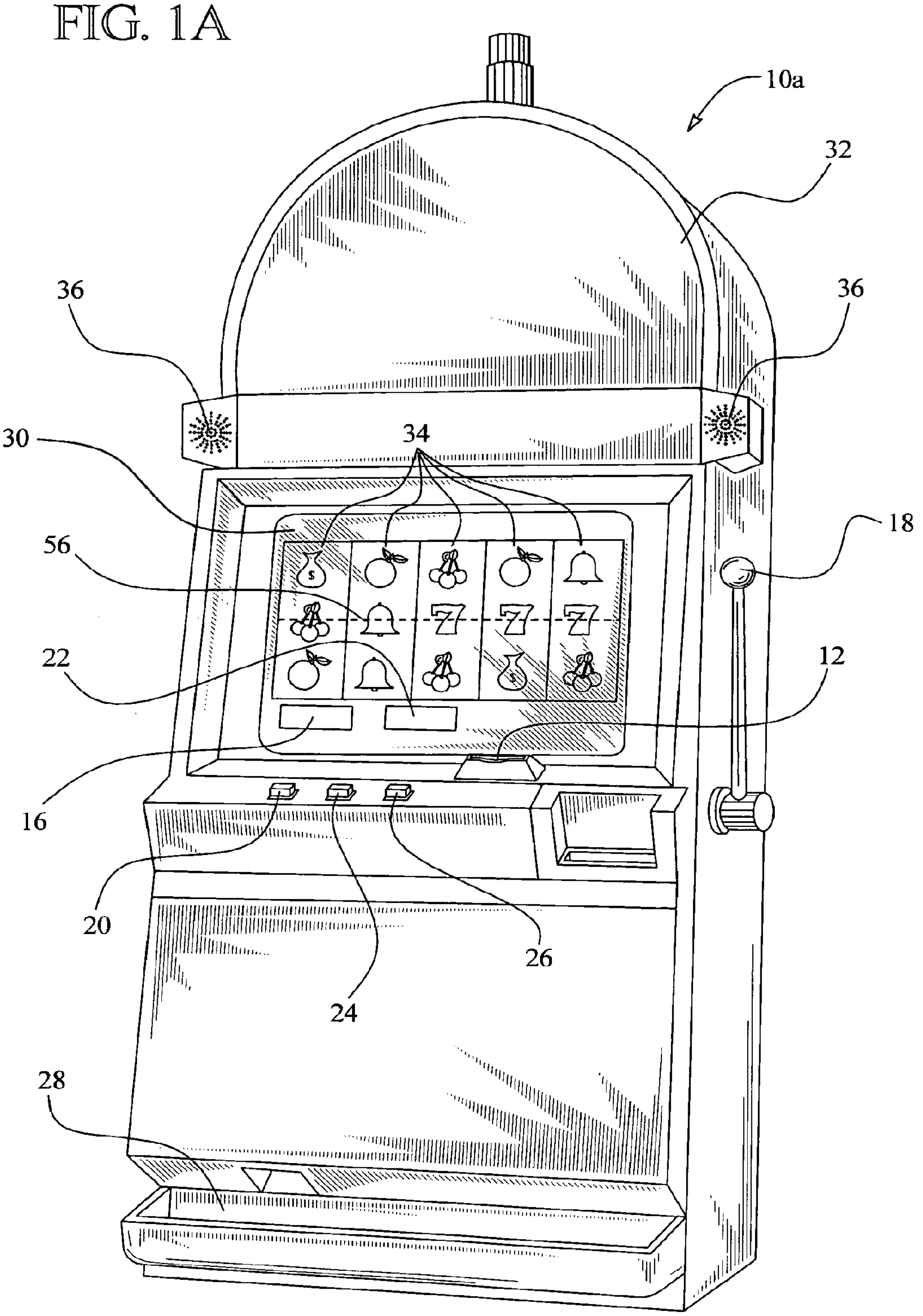
FIGS. 1A and 1B are perspective views of alternative embodiments of the gaming device of the present invention.
Figure 1B:
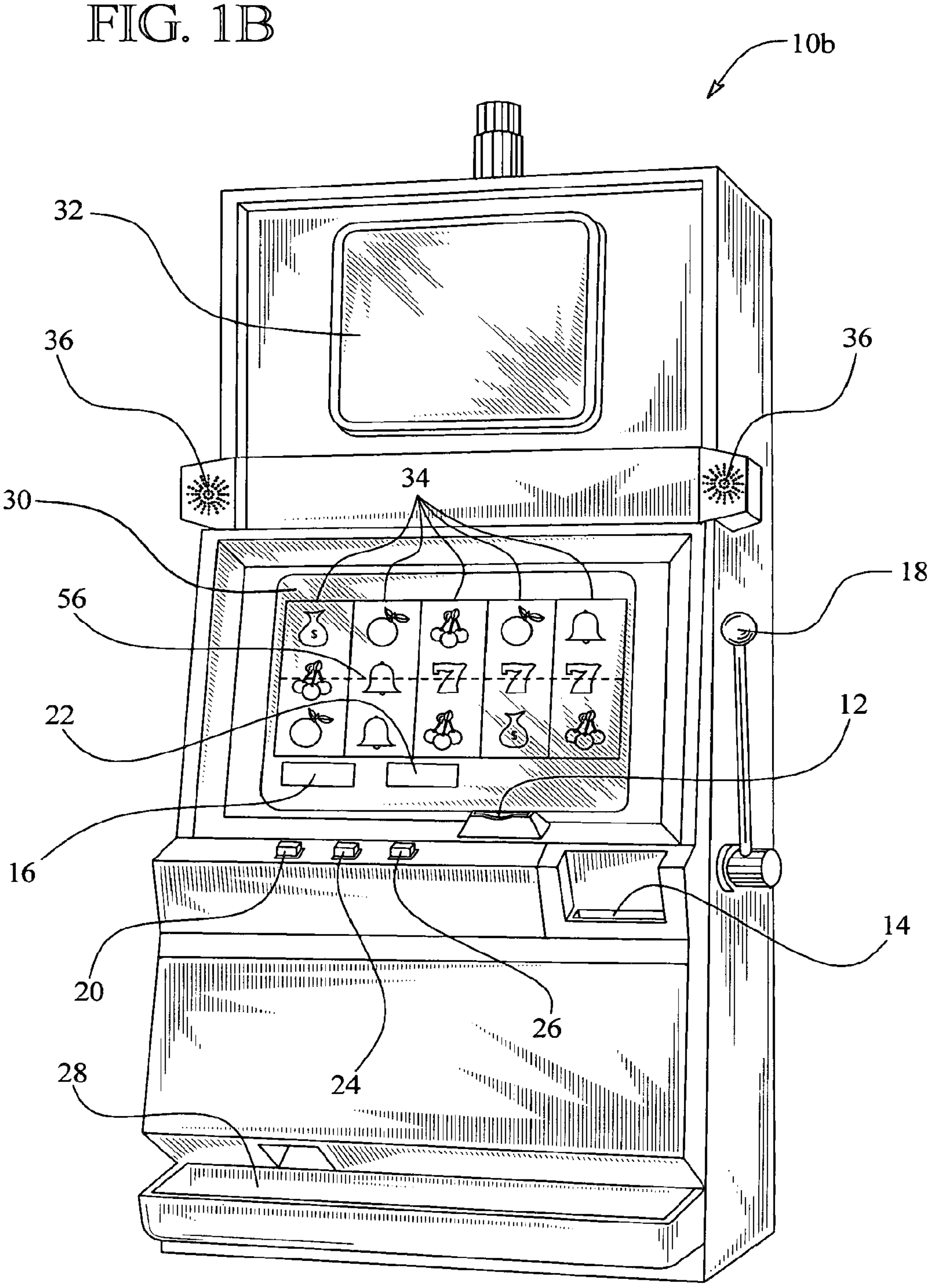

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game, described below, being a stand alone game or a bonus or secondary game that coordinates with a base game. When the game of the present invention is a bonus game, gaming device 10 in one base game can be a slot machine having the controls, displays and features of a conventional slot machine, or a video card game such as poker, blackjack, etc. The player can operate the gaming device while standing or sitting. Gaming device 10 also includes being a pub-style or table-top game (not shown), which a player operates while sitting.

The base games of the gaming device 10 include slot, poker, or blackjack. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
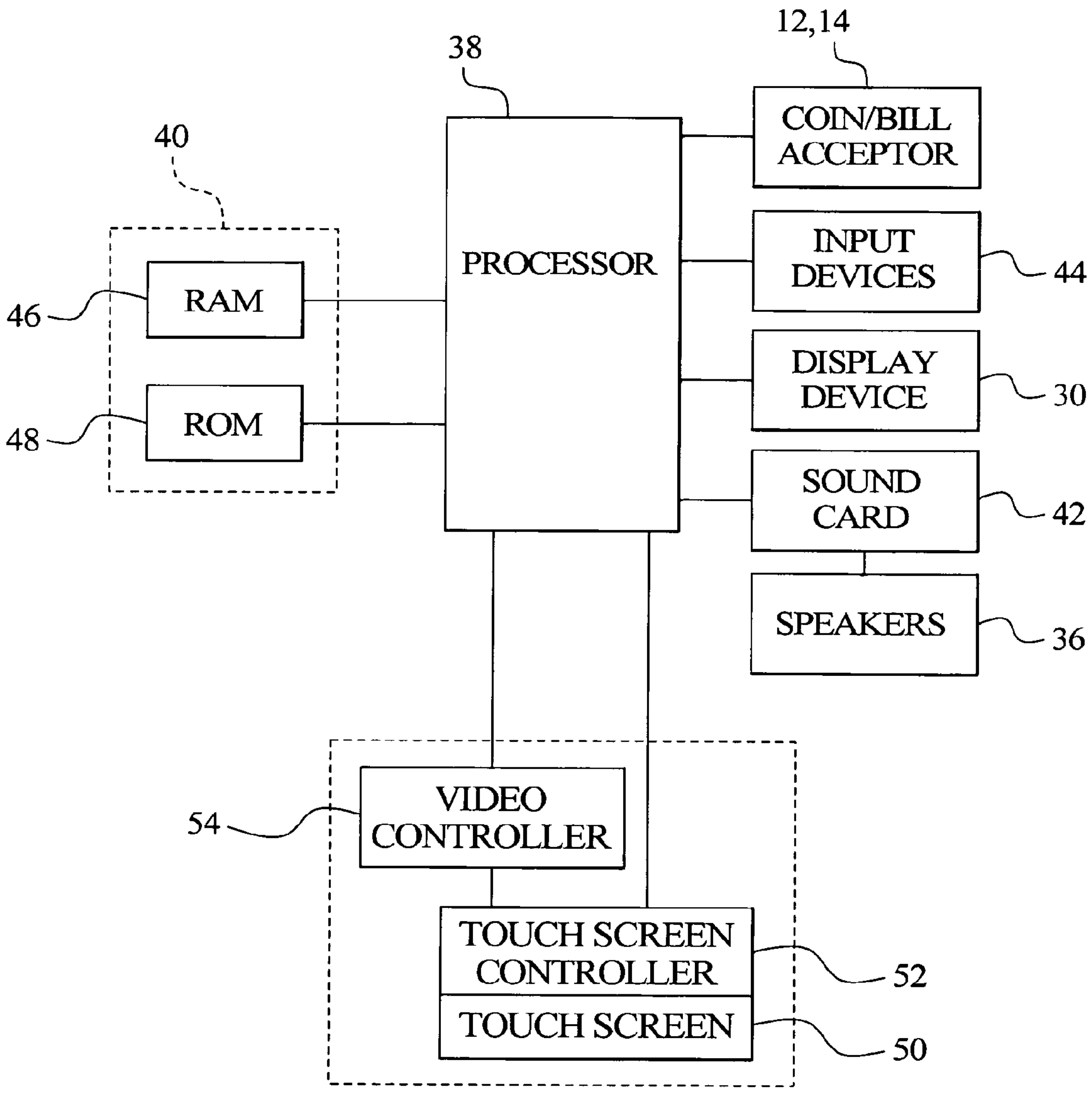
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

Wild Activation and Wild Termination Symbols

Figure 3A:
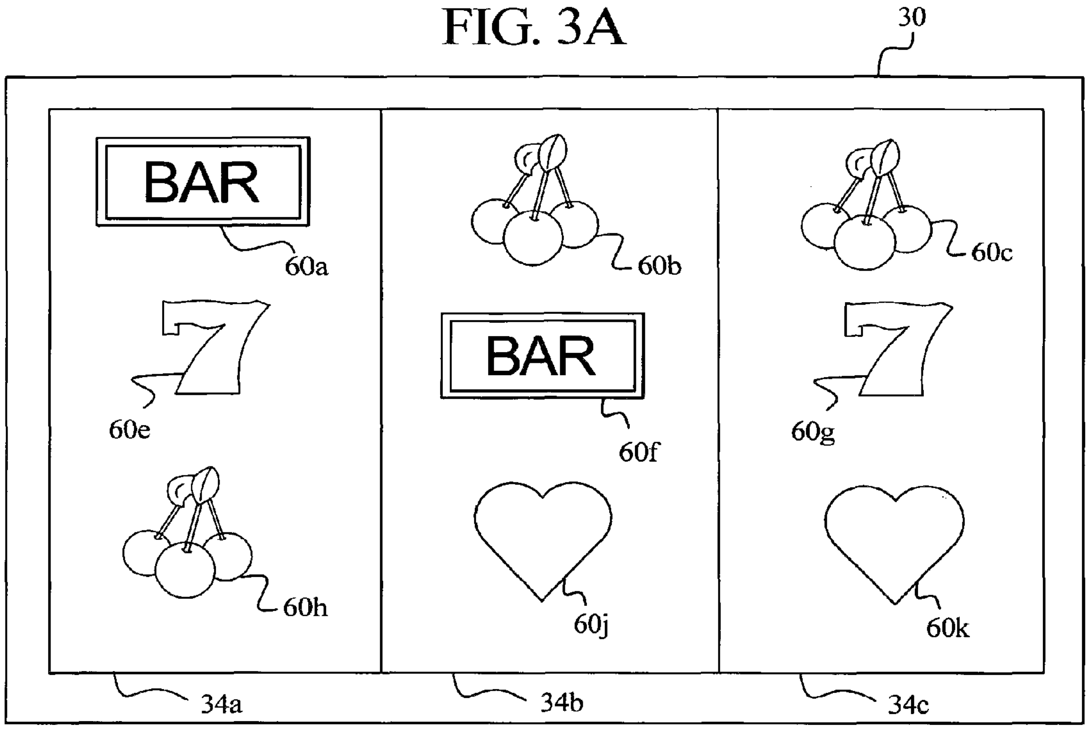
FIGS. 3A, 3B, 3C and 3D are front elevation views of a display device in which a wild activation symbol and wild termination symbol are displayed on a set of reels.

Referring now to FIG. 3A, a display device 30 displays a plurality of reels 34. The reels include a plurality of symbols 60 such as hearts, cherries, numbers, or any other suitable symbols. Any of the symbols on the reels may function as or be a wild activation symbol. Thus, the wild activation symbol can be any symbol and is not immediately distinguishable from the other symbols. The processor randomly selects which of the symbols will be the wild activation symbol and displays the wild activation symbol to the player. The processor then sequentially transforms one or more of the other symbols 60 on the reels into wild symbols.

Figure 3B:
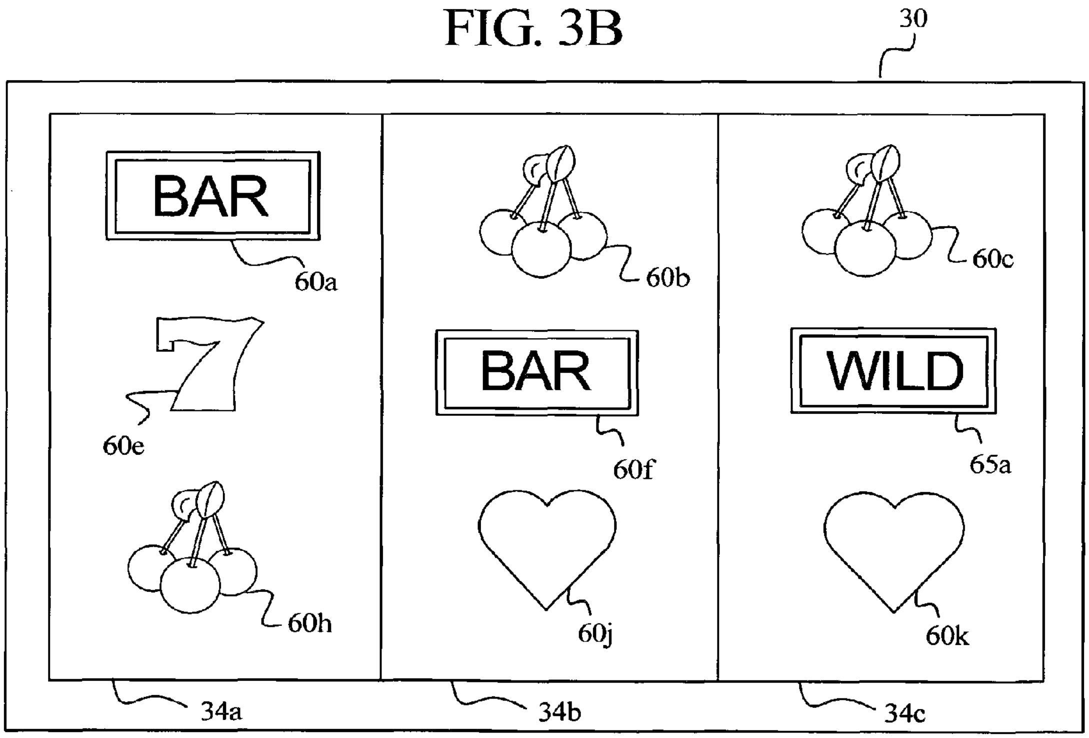
Figure 3C:
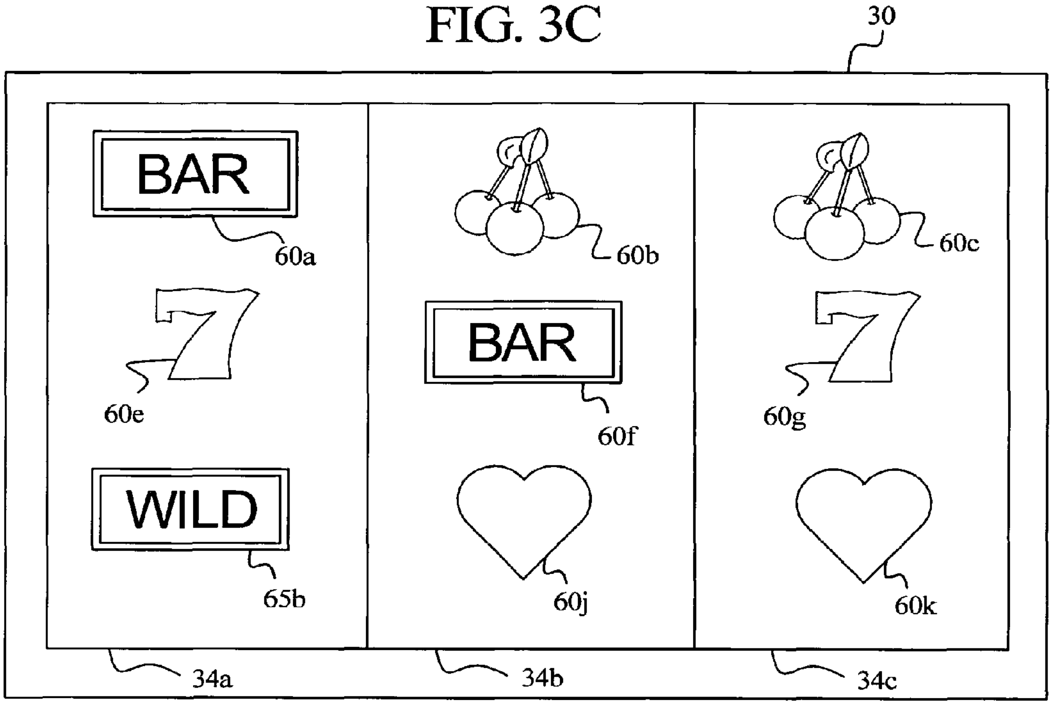
Figure 3D:
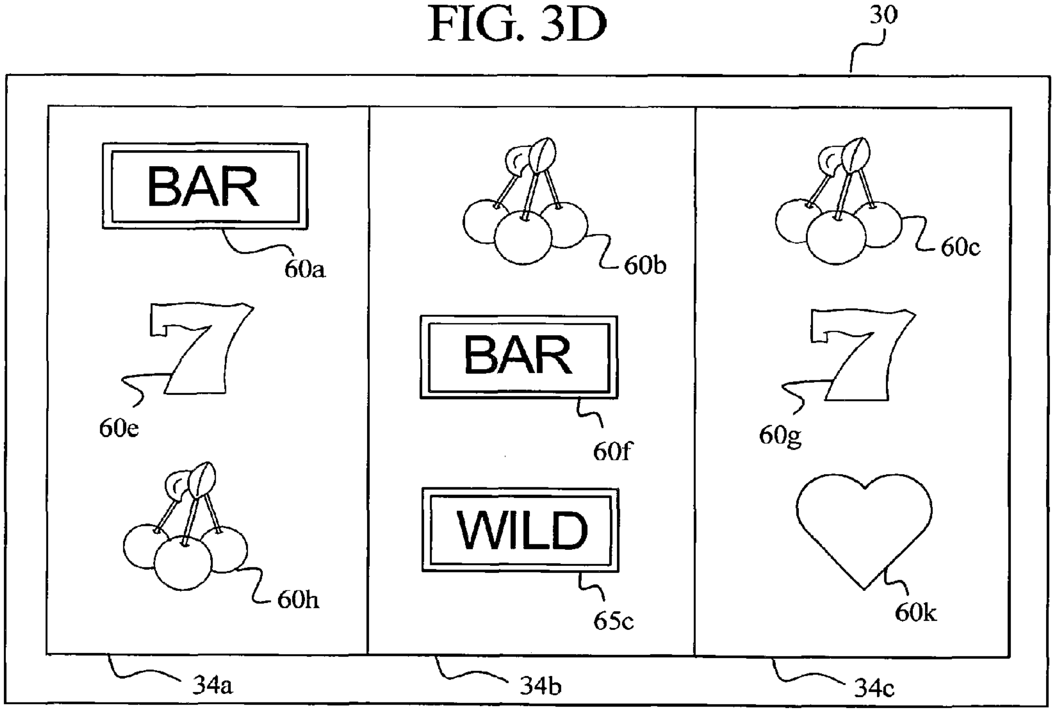

For example, a player activates or spins the reels using the control features of the gaming device. After at least one, a plurality or all of the reels stop spinning, a wild activation symbol may be displayed within the display device. In FIGS. 3B-3D, the processor determines that a BAR symbol 60*f* which is not immediately distinguishable from the other symbols and is displayed within the display device on the second reel 34*b* will be the wild activation symbol. The processor causes other symbols to become wild in a horizontal direction. Thus, the "7" symbol 60*g* displayed on the third reel 34*c* becomes a wild symbol 65*a* as illustrated in FIG. 3B and any award is determined by the processor and provided to the player. Then, that symbol changes back to a "7" and the cherry symbol 60*h* on the first reel 34*a* becomes a wild symbol 65*b* as illustrated in FIG. 3C. Subsequently, the heart symbol 60*j* on the second reel 34*b* becomes a wild symbol 65*c* as illustrated in FIG. 3D.

When the processor selects a symbol to be the wild activation symbol, the processor also selects a symbol to be the wild termination symbol. The wild termination symbol is also initially indistinguishable from the other symbols. In this example, the processor chooses the heart symbol 60*k* on the third reel 34*c* to be the wild termination symbol. After the processor changes symbol 60*k*, into a wild symbol and determines any associated awards, the processor stops changing further symbols into wild symbols. It should be appreciated that when the processor chooses a symbol as the wild activation symbol or the wild termination symbol, for which there are duplicate symbols, the only symbols which function as the wild activation symbol and the wild termination symbol are those symbols selected at the specific positions within the display device.

The processor determines if the wild activation symbol and the wild termination symbol will occur during a reel spin in a random or predetermined manner after the reels are activated. If the processor determines that a wild activation symbol will occur or be displayed within the display device, the processor also determines, in a random or predetermined manner, where the wild termination symbol will occur or be displayed, if at all, within the display device.

The gaming device provides a signal to a player that each symbol is transformed into a wild symbol. An example is the displaying of a symbol in the form of the word "WILD." In yet another example, a speaker emits a sound or message indicating the card is wild. In an embodiment in which the reels are mechanical, a backlight can be used to illuminate symbols which become wild. Any other audio or visual method of notification is also contemplated for the video or mechanical embodiments.

Figure 4A:
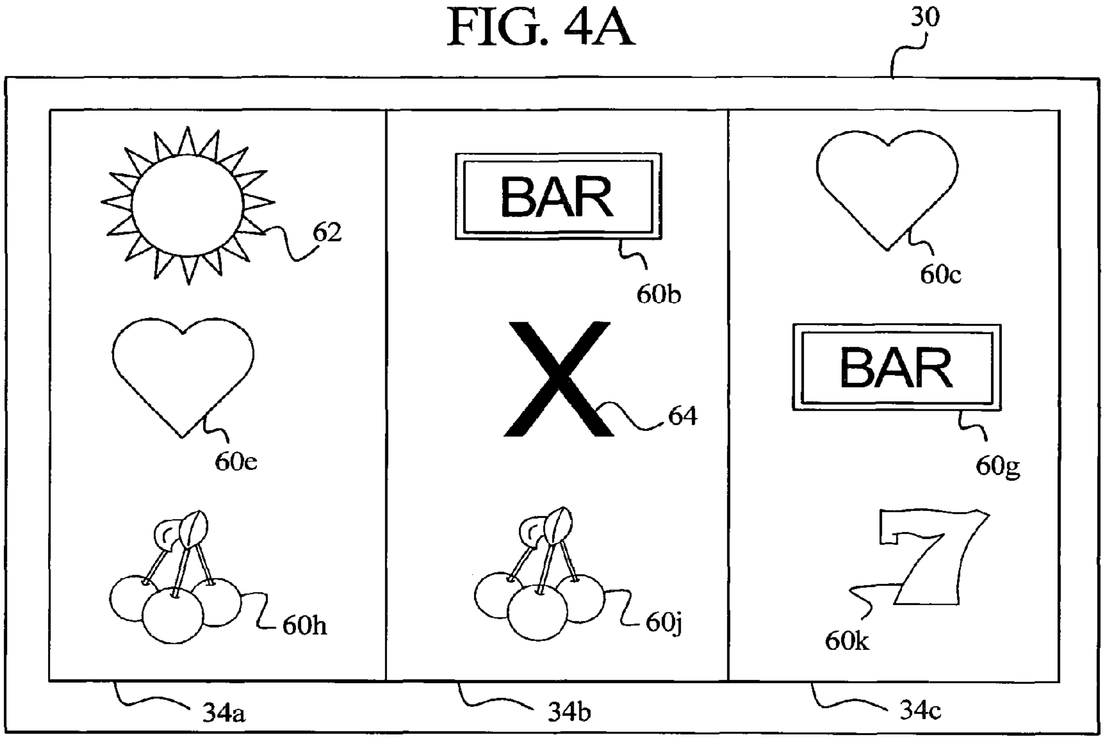
FIGS. 4A, 4B, 4C and 4D are front elevation views of a display device in which a wild activation symbol and wild termination symbol are displayed on a set of reels.
Figure 4B:
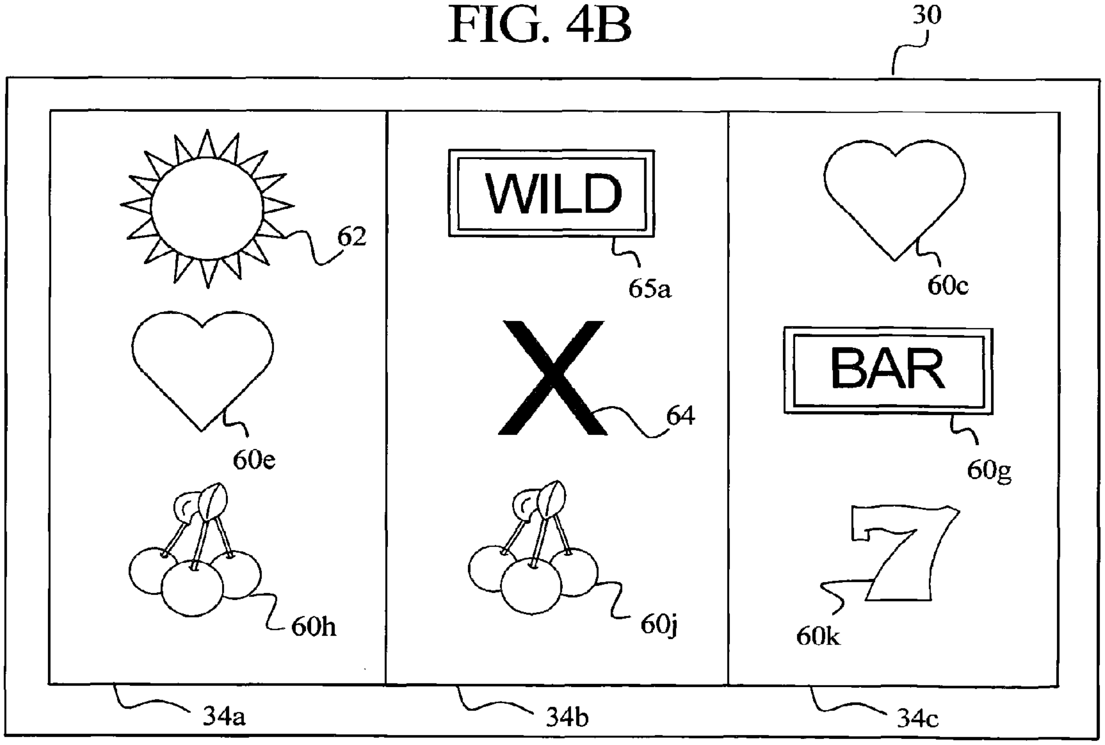
Figure 4C:
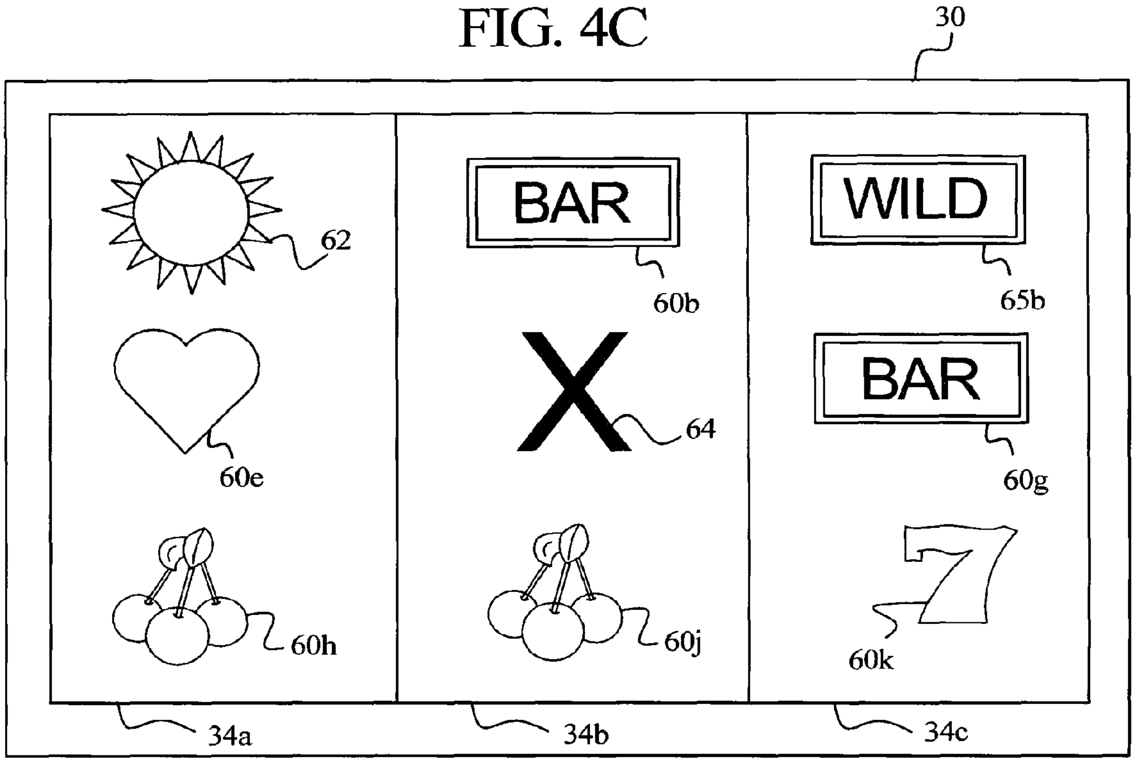
Figure 4D:
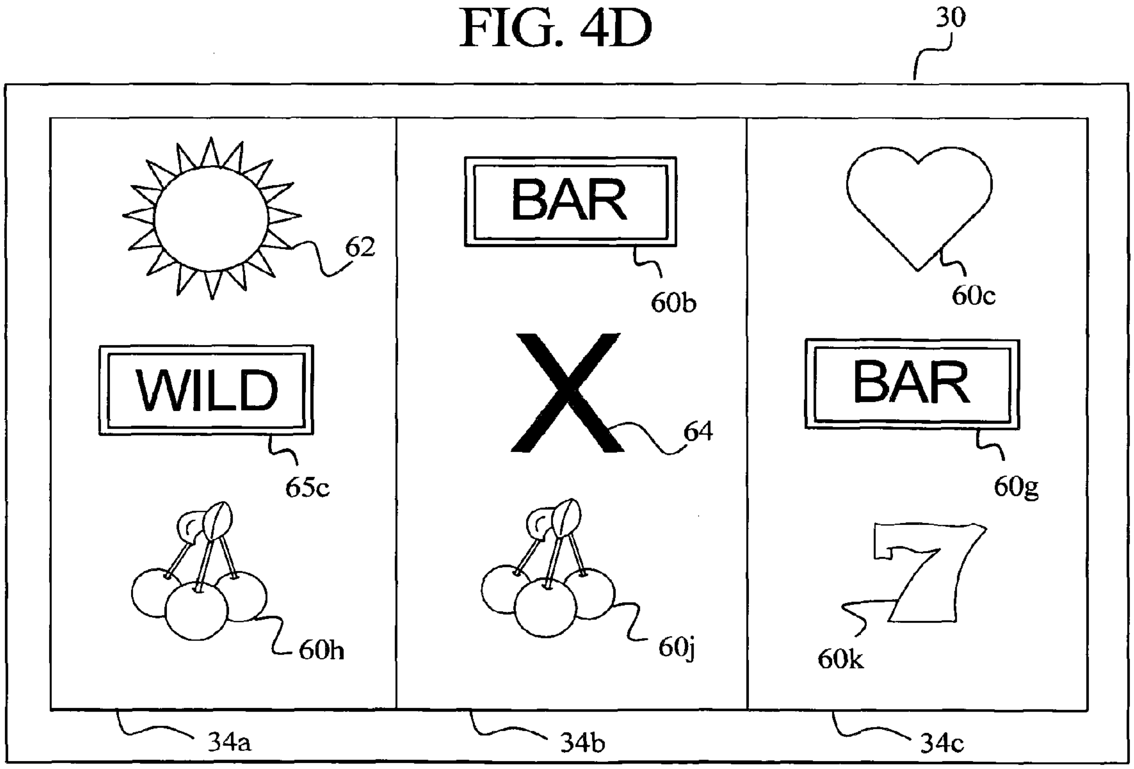

In another embodiment, the wild activation symbol and wild termination are fixed on the reels and immediately distinguished from the other symbols on the reels. In an example, the display device 30 displays three reels 34*a*, 34*b* and 34*c*, as illustrated in FIG. 4A. After the reels are spun, the top position on the first reel 34*a* displays a wild activation symbol 62 in the form of a sun symbol. The processor causes the symbols displayed within the display device to sequentially become wild. In this example, the other symbols become wild in a horizontal direction. As a result, the BAR symbol 60*b* on the second reel 34*b* becomes a wild symbol 65*a* as illustrated in FIG. 4B and the processor determines any awards. Next, that symbol changes back and the heart symbol 60*c* on the third reel 34*c* becomes a wild symbol 65*b* as illustrated in FIG. 4C and the processor determines any awards. The processor continues to transform symbols into wild symbols along the middle row of the display device. As a result, the heart symbol 60*e* on the first reel 34*a* subsequently becomes a wild symbol 65*c* as illustrated in FIG. 4D. The wild termination symbol 64 represented by the "X" in the middle position of the second reel. Accordingly, the processor stops further symbols from becoming wild in the horizontal direction beyond the position which the termination symbol occupies.

Figure 5A:
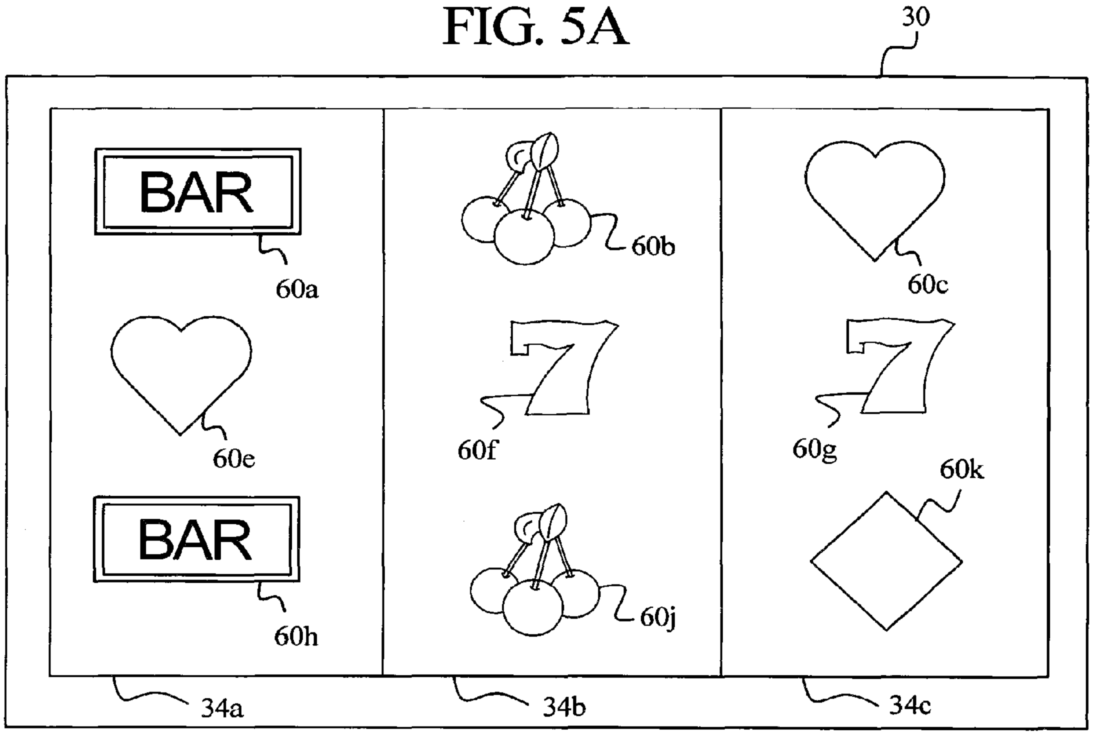
FIGS. 5A, 5B, 5C, 5D and 5E are front elevation views of a display device in which a wild activation symbol and wild termination symbol are displayed on a set of reels.
Figure 5B:
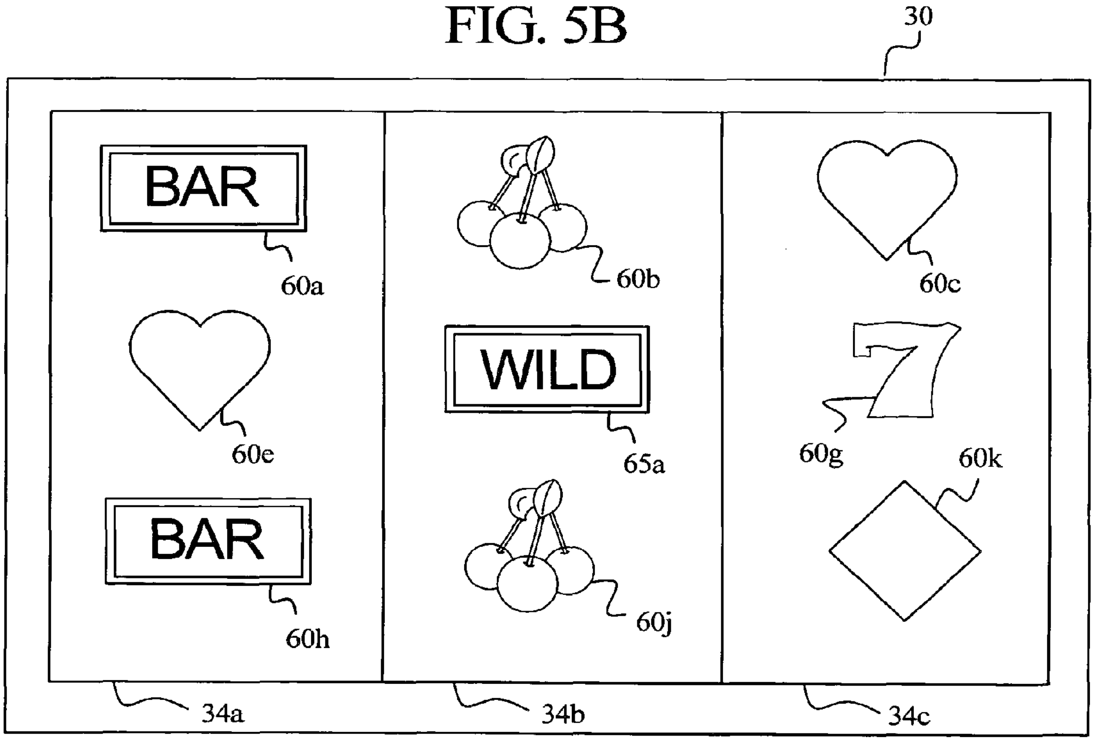
Figure 5C:
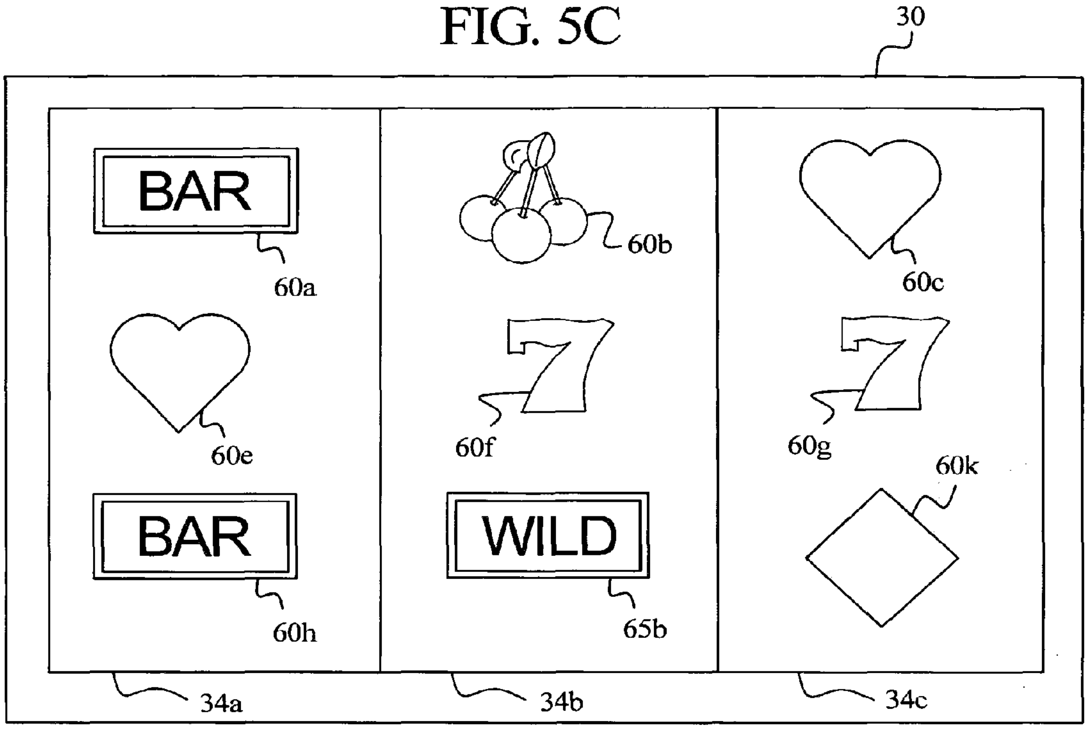
Figure 5D:
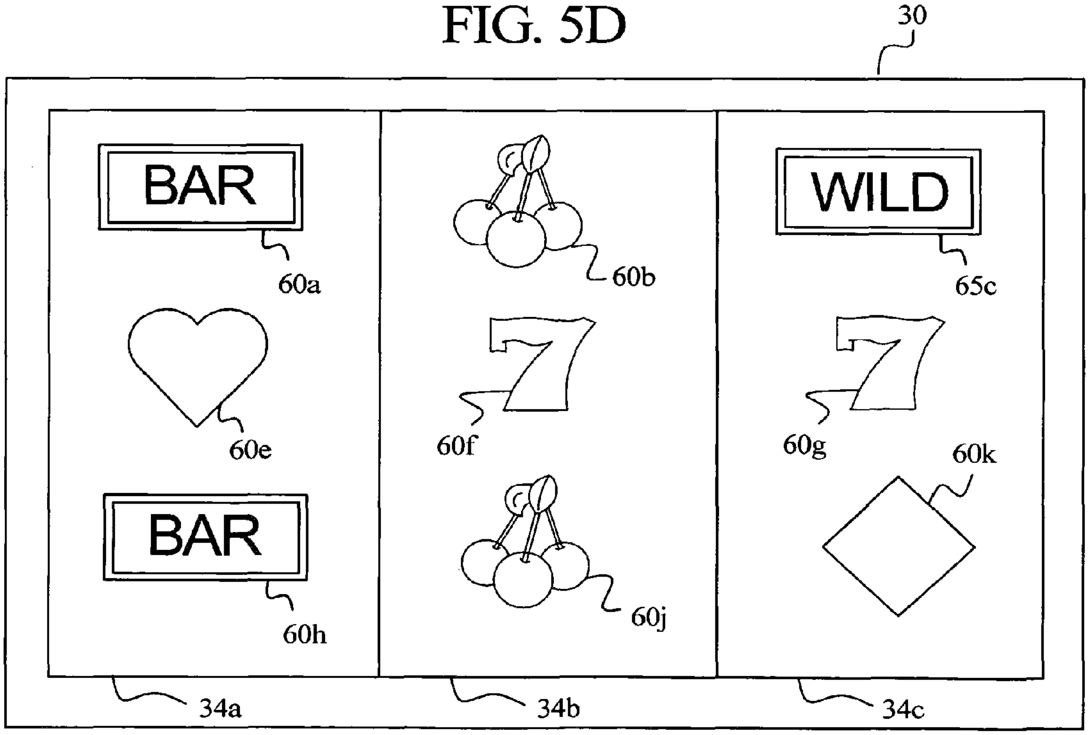
Figure 5E:
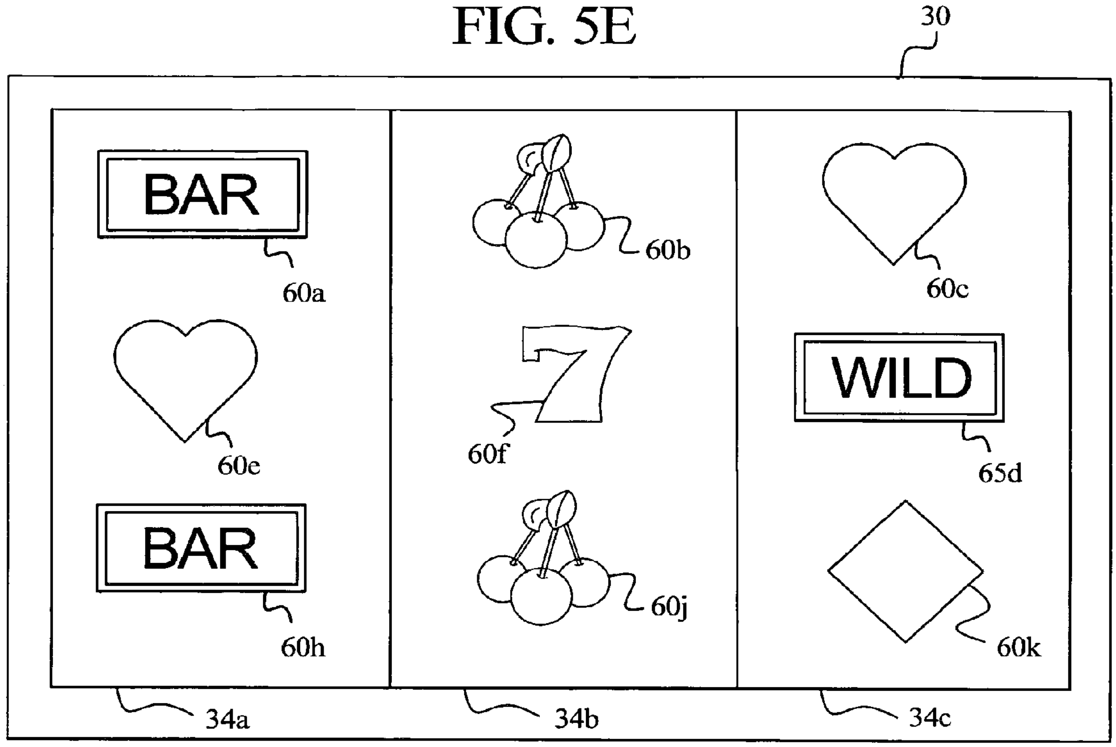

In another embodiment, the processor transforms symbols into wild symbols in a vertical direction within the display device. For example, a display device 30 displays three reels as shown in FIG. 5A. After the reels are spun, the second reel 34*b* displays a wild activation symbol in the form of a cherry symbol 60*b*. The third reel 34*c* displays a wild termination symbol in the form of a diamond symbol 60*k*. The processor transforms the "7" symbol 60*f* on the second reel into a wild symbol 65*a* as illustrated in FIG. 5B and the processor determines any award. Next, that symbol changes back and the cherry symbol 60*j* on the second reel is transformed into a wild symbol 65*b* as illustrated in FIG. 5C and the processor determines any award. The heart symbol 60*c* on the third reel then becomes a wild symbol 65*c* as illustrated in FIG. 5D and the processor determines any award. Next, the "7" symbol 60*g* on the third reel 34*c* becomes a wild symbol 65*d* as illustrated in FIG. 5E and the processor determines any award. The processor then stops further symbols from becoming wild in a vertical direction beyond the position the wild termination symbol occupies.

Figure 6A:
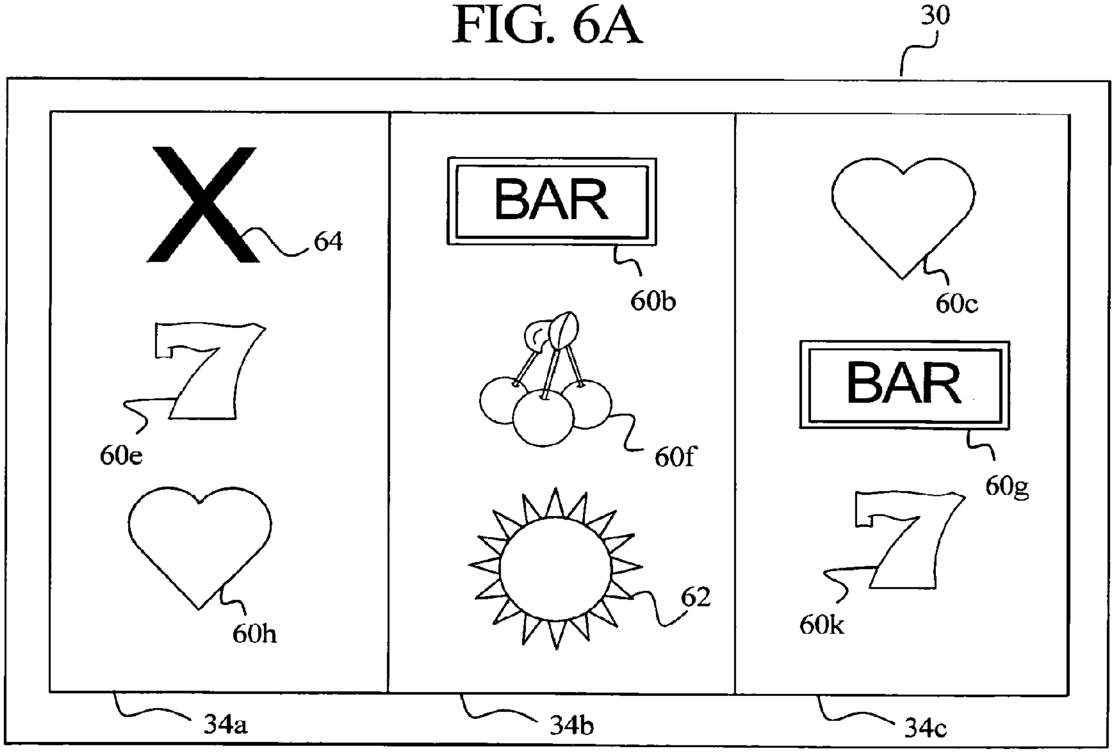
FIGS. 6A, 6B, 6C, 6D and 6E are front elevation views of a display device in which a wild activation symbol and a wild termination symbol are displayed on a set of reels.
Figure 6B:
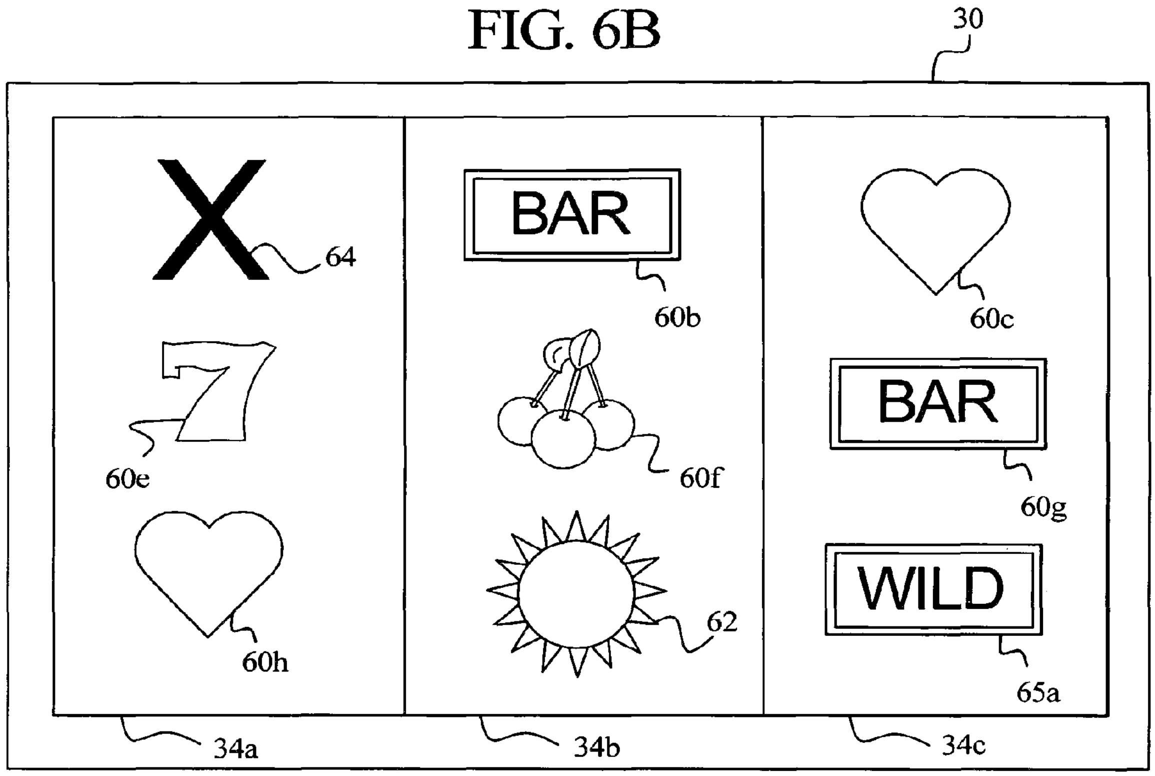
Figure 6C:
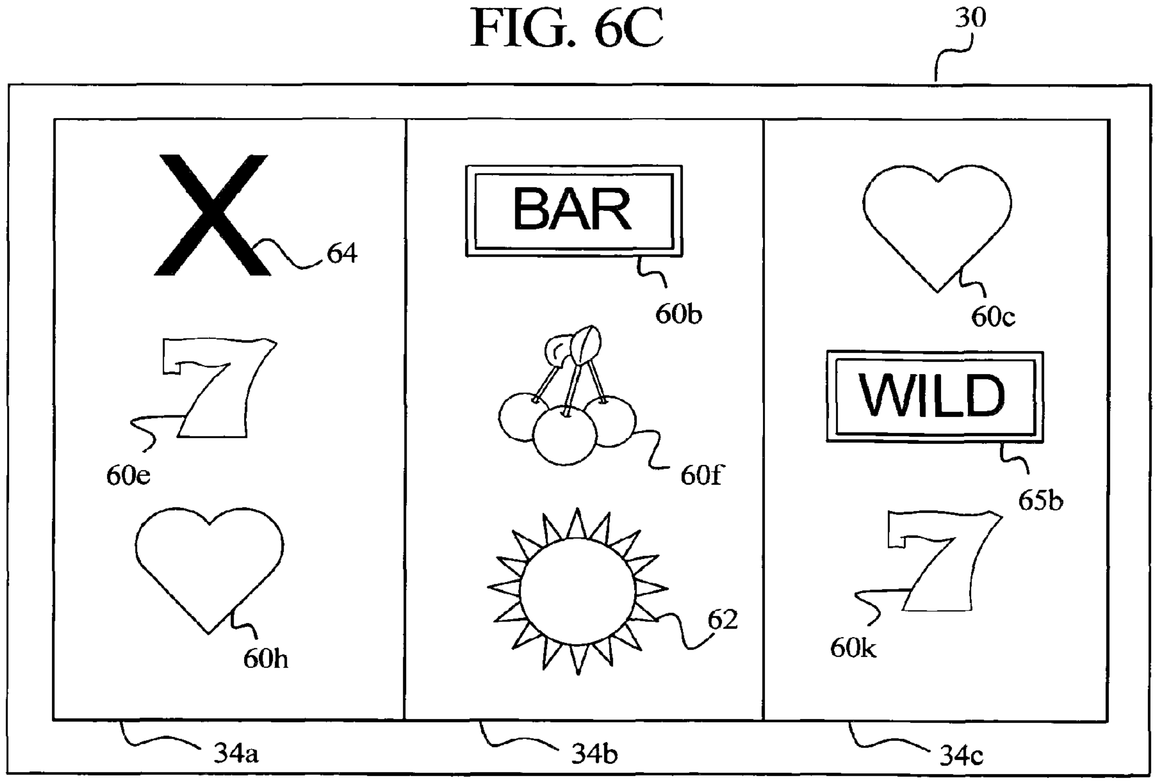
Figure 6D:
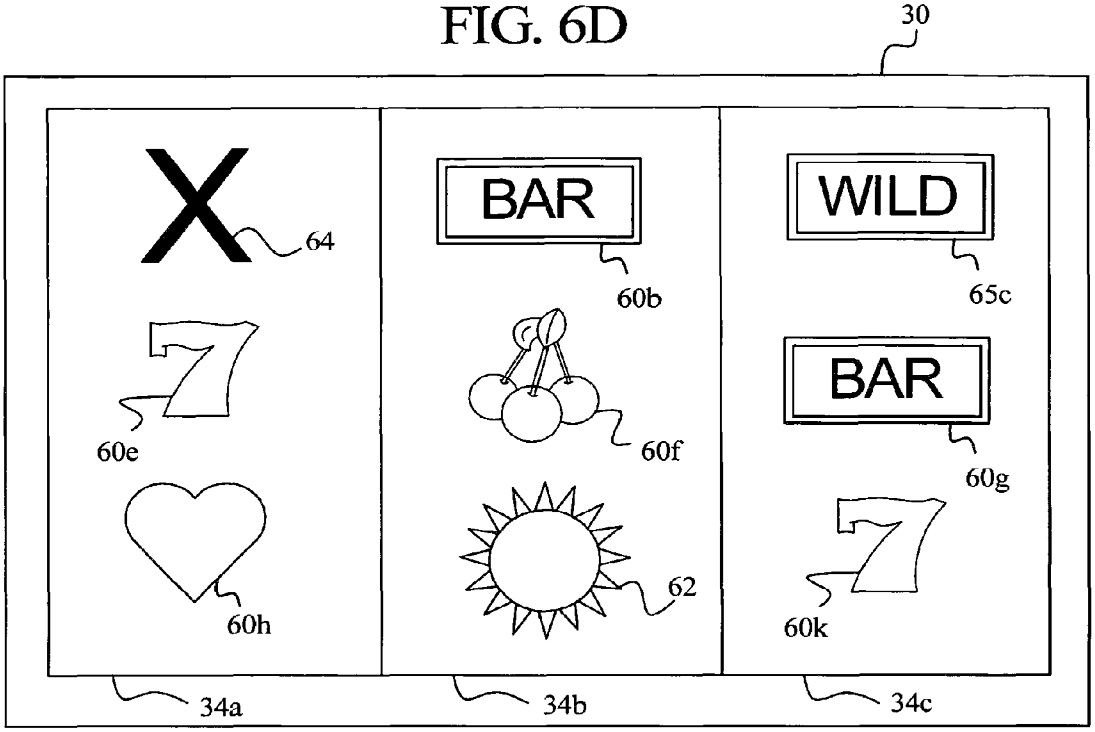
Figure 6E:
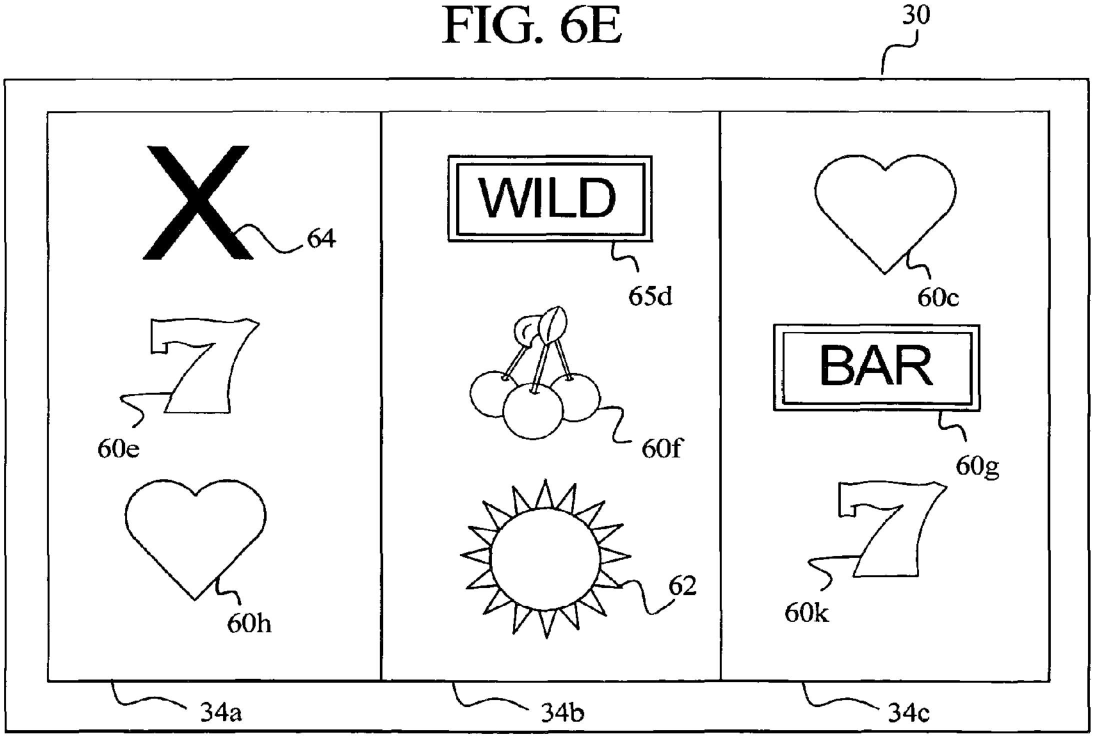

In one embodiment, the processor transforms symbols into wild symbols in a circular direction within the display device when the wild activation symbol and wild termination symbol are present within the display device. For example, the display device displays three reels 34*a*, 34*b* and 34*c*, and after the reels are spun or activated, a wild activation symbol 62 is displayed on the second reel as illustrated in FIG. 6A. A wild termination symbol 64 is displayed on the first reel 34*a*. The processor transforms the "7" symbol 60*k* displayed on the third reel into a wild symbol 65*a* as illustrated in FIG. 6B and the processor determines any award. Next, that symbol changes back and the BAR symbol 60*g* displayed on the third reel 34*c* then becomes a wild symbol 65*b* as illustrated in FIG. 6C. The heart symbol 60*c* on the third reel then becomes a wild symbol 65*c* as illustrated in FIG. 6D. The BAR symbol 60*b* on the second reel 34*b* then becomes a wild symbol 65*d* as illustrated in FIG. 6E. The processor stops further symbols from becoming wild in the circular direction beyond the position which the wild termination symbol 64 occupies.

It should be appreciated that the processor can cause symbols to become wild in any direction, (i.e., horizontally, vertically, diagonally) when a wild activation symbol is displayed within the display device. It should also be appreciated, that, when the processor transforms symbols in a particular direction and comes to an end of a reel or row, further transformations can occur on non-adjacent reels or rows. In an example, if the processor causes the top row of reels to become wild in a horizontal direction, the transformations can then continue along the bottom row of reels.

Figure 7A:
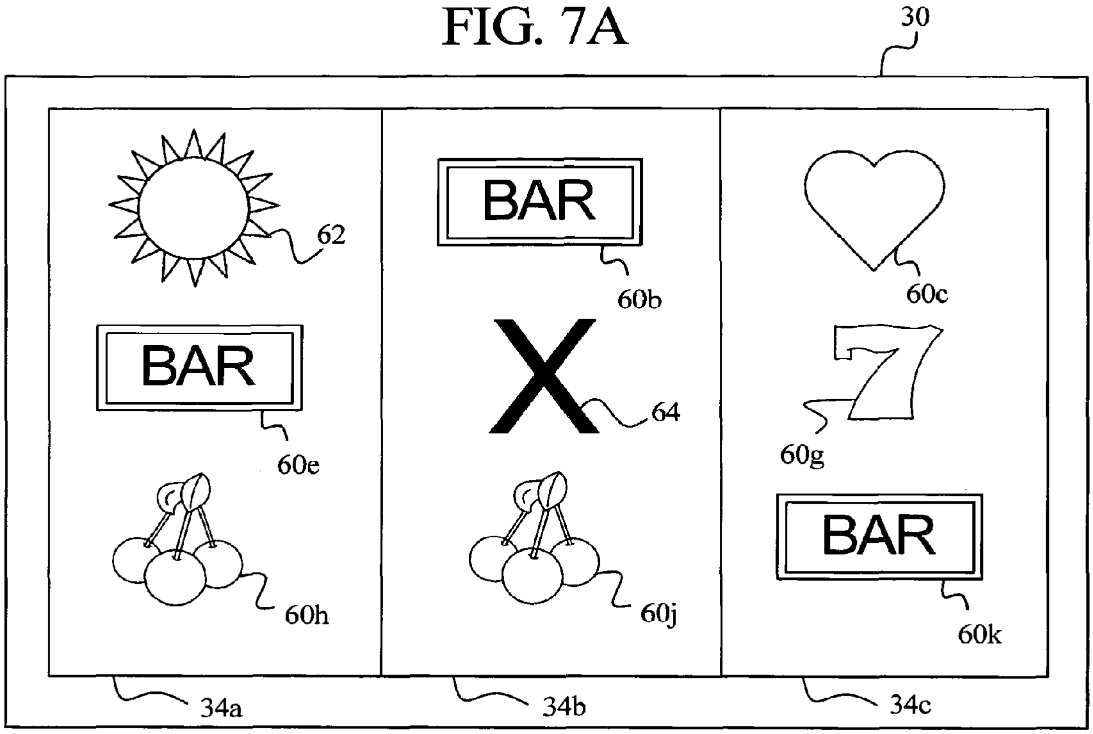
FIGS. 7A, 7B, 7C and 7D are front elevation views of a display device in which symbols displayed on a set of reels serve as a wild activation symbol and a wild termination symbol.
Figure 7B:
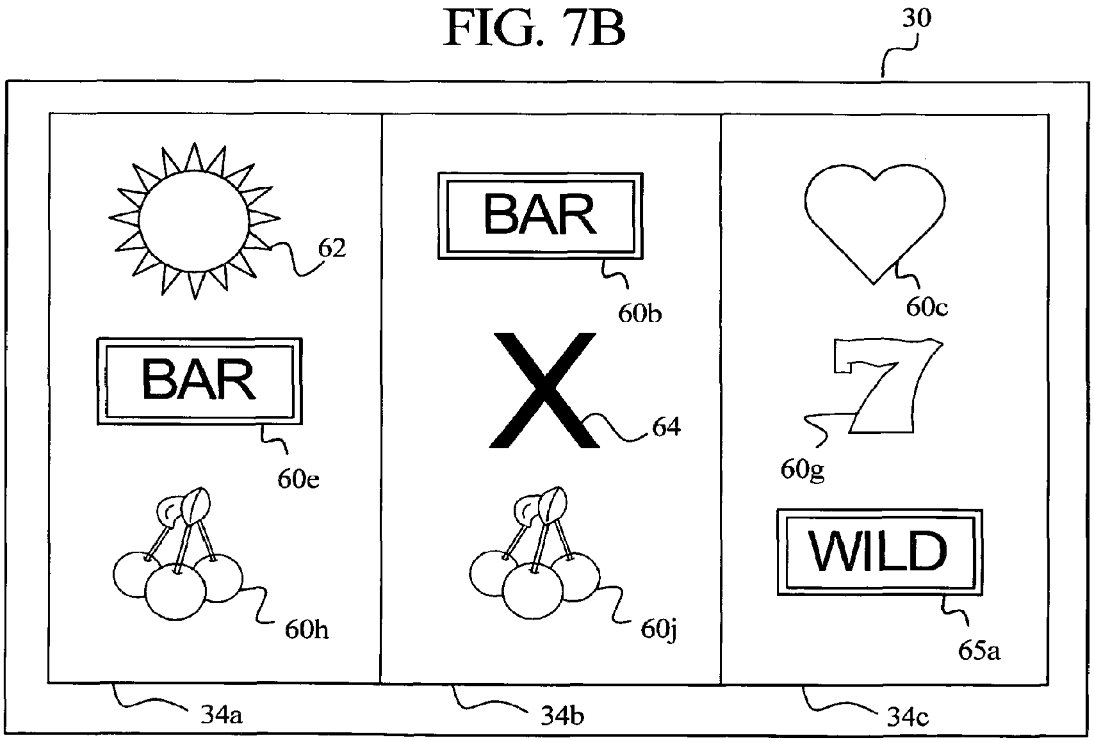
Figure 7C:
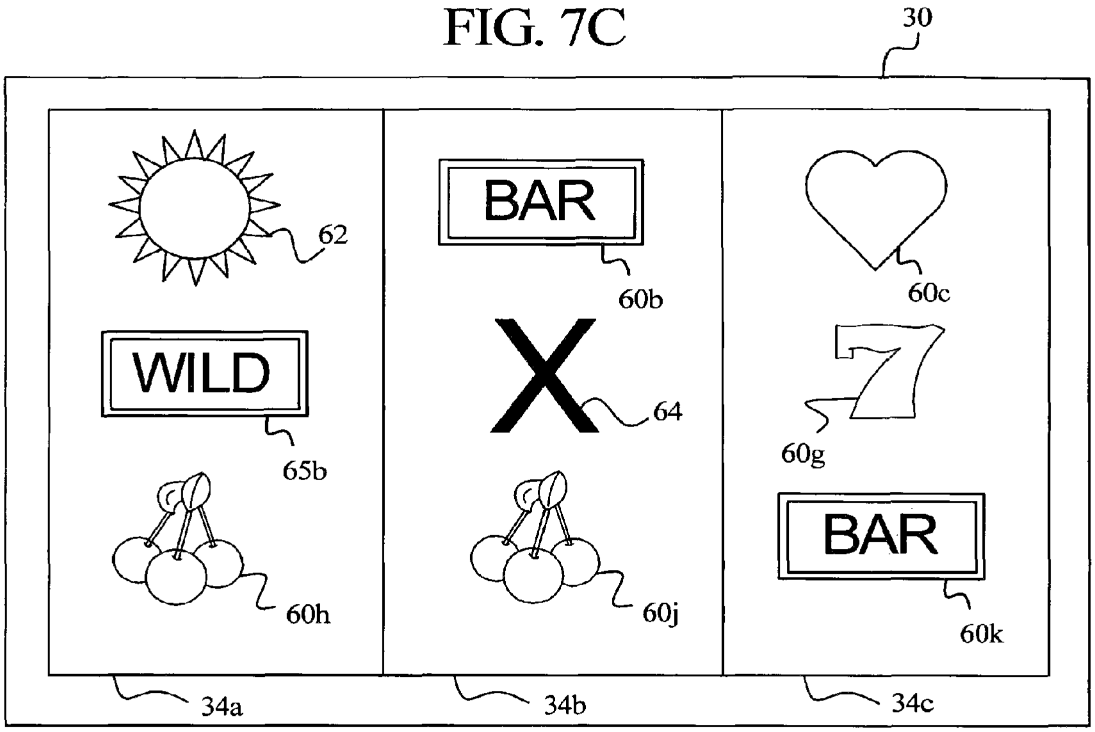
Figure 7D:
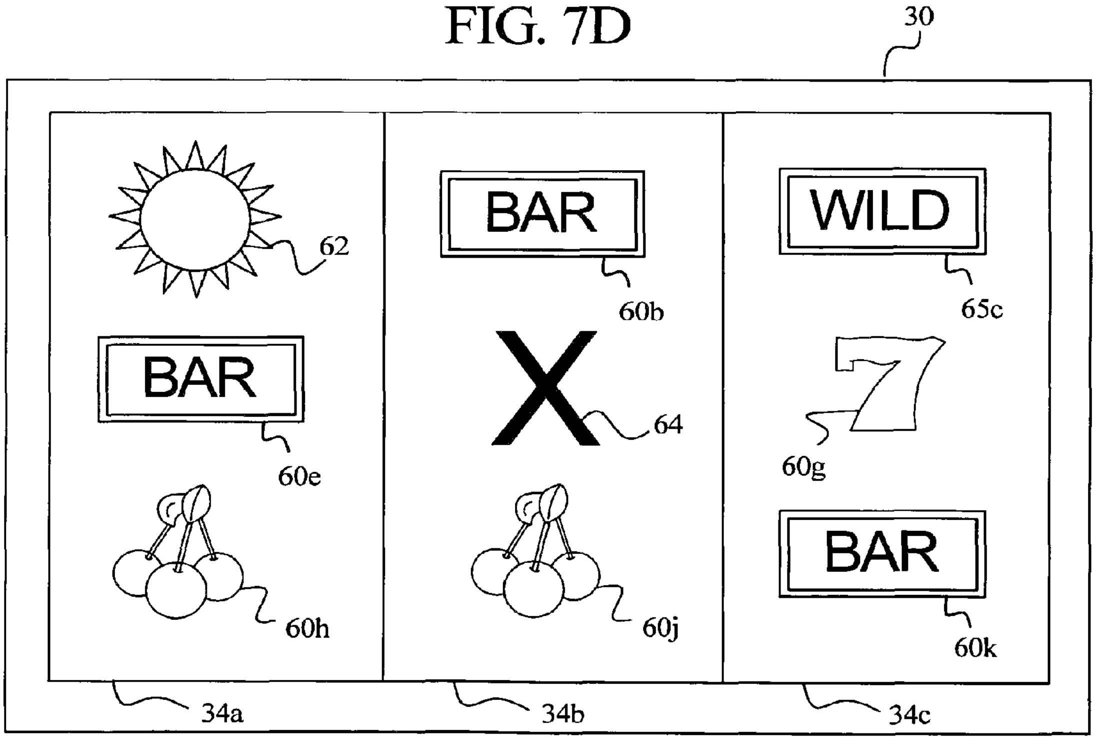

In one embodiment, the processor transforms other symbols into wild symbols in a random sequence (i.e., not along a predetermined path or direction) when the wild activation symbol and wild termination symbol are displayed within the display device 30. For example, after the reels are spun, a wild activation symbol 62 appears in a top position of the display device on the first reel 34*a*, as illustrated in FIG. 7A. The wild termination symbol 64 appears in a middle position of the display device on the second reel 34*b*. The processor randomly causes the BAR symbol 60*k* appearing on the third reel 34*c* to become a wild symbol 65*a* as illustrated in FIG. 7B and the processor determines any award. That symbol changes back and the processor randomly selects the BAR symbol 60*e* on the first reel 34*a* to become wild as illustrated in FIG. 7C. That symbol changes back and the processor randomly selects the heart symbol 60*c* on the third reel to become wild as illustrated in FIG. 7D. The processor prevents further transformations of symbols into wild symbols when the processor chooses to transform a symbol in the position occupied by the wild termination symbol.

Figure 7E:
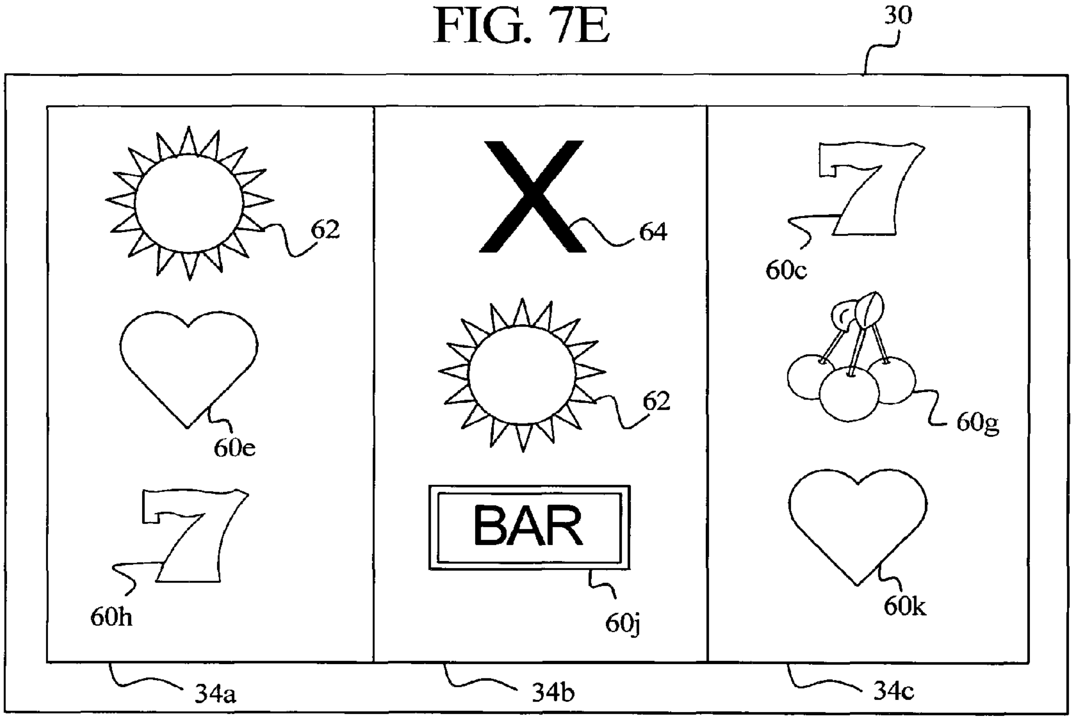
FIG. 7E is a front elevation view of a display device in which more than one symbol displayed on a set of reels serves as a wild activation symbol.
Figure 7F:
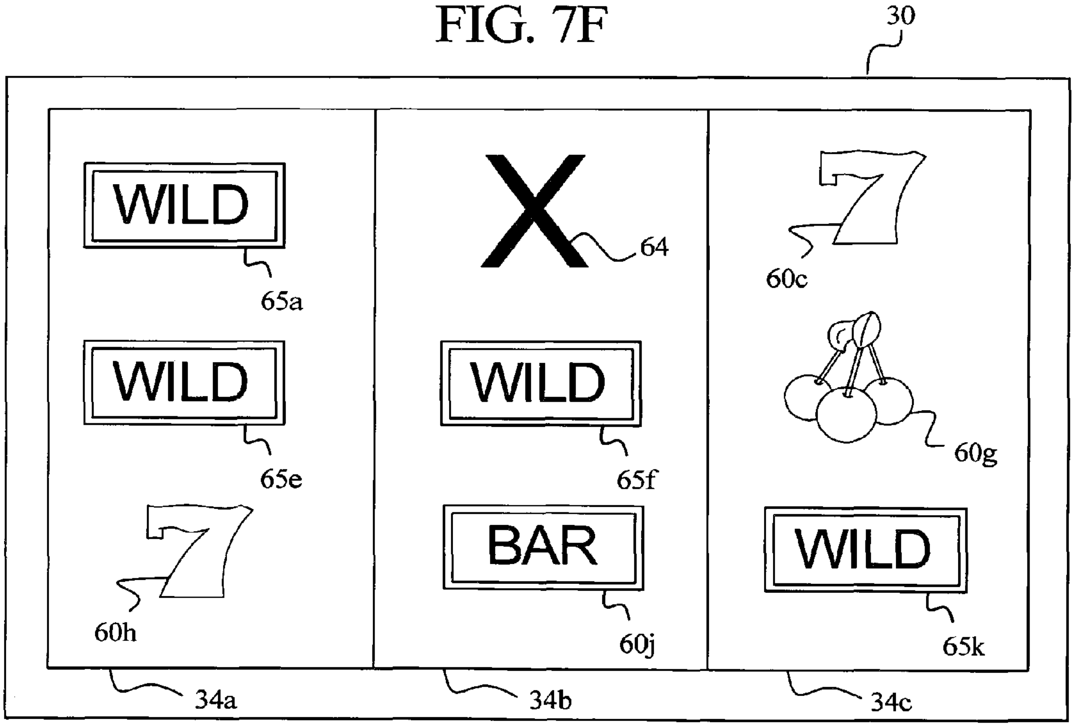
FIG. 7F is a front elevation view of a display device in which more than one symbol displayed on a set of reels serves as a wild termination symbol.

It should be appreciated that in alternative embodiments, the processor can cause one or more wild activation symbols on the reels within the display device. For example, in FIG. 7E, after the reels are spun, the processor determines that a sun symbol 62 which is not immediately distinguishable from the other symbols and is displayed within the display device on the first reel 34*a* is a wild activation symbol. The processor also determines that a heart symbol 60*a* is a wild activation symbol. The processor causes other sun symbols and heart symbols to become wild. The sun symbol 62 displayed on the second reel 34*b* becomes a wild symbol 65*f* as illustrated in 7F. The heart symbol 60*k* displayed on the first reel 34*a* becomes a wild symbol 65*k* as illustrated in 7F. It should be also appreciated that the processor can cause one or more related wild termination symbols on the reels within the display device. As a result, the display device may display one or more sets of symbols which are transformed into wild symbols. The sets can transform simultaneously or successively. Thus, for example, if two sets of a wild activation symbol and a related wild termination symbol appear, each set will be independently utilized. For example, in FIG. 7E, after the reels are spun, the processor determines that a BAR symbol 60*j* is a wild termination symbol. The processor also determines that a "7" symbol 60*h* is a wild termination symbol.

In a further embodiment, one or more wild activation symbols and one or more wild termination symbols are fixed on the reels. The processor may determine whether to display the wild activation symbol, the wild termination symbol, or both. If a wild termination symbol alone occurs, no symbols are changed into wild symbols. If a wild activation symbol and a wild termination symbol are displayed, the symbol transforms into wild symbols as described above. If a wild activation symbol occurs without a wild termination symbol, one, plurality, or all of the displayed symbols can transform into wild symbols.

In one embodiment of the present invention, the gaming device and specifically one or more of the reels (or cards as described below) will include natural or dedicated wild symbols which function in a conventional manner. If a transformation process occurs when one of these natural wild symbols are displayed on one or more of the reels, the transformation in one embodiment causes the natural wild symbol to become a modifier such as a multiplier which multiplies or otherwise modifies the award, if any, provided to the player. It should be appreciated that the natural wild symbol could alternatively transform into other modifiers such as one or more free games, more bonus games or bonus game triggers, or one or more repeats of the transformation process. It should also be appreciated that the processor could selectively or randomly determine to transform the natural wild symbol.

Figure 8A:
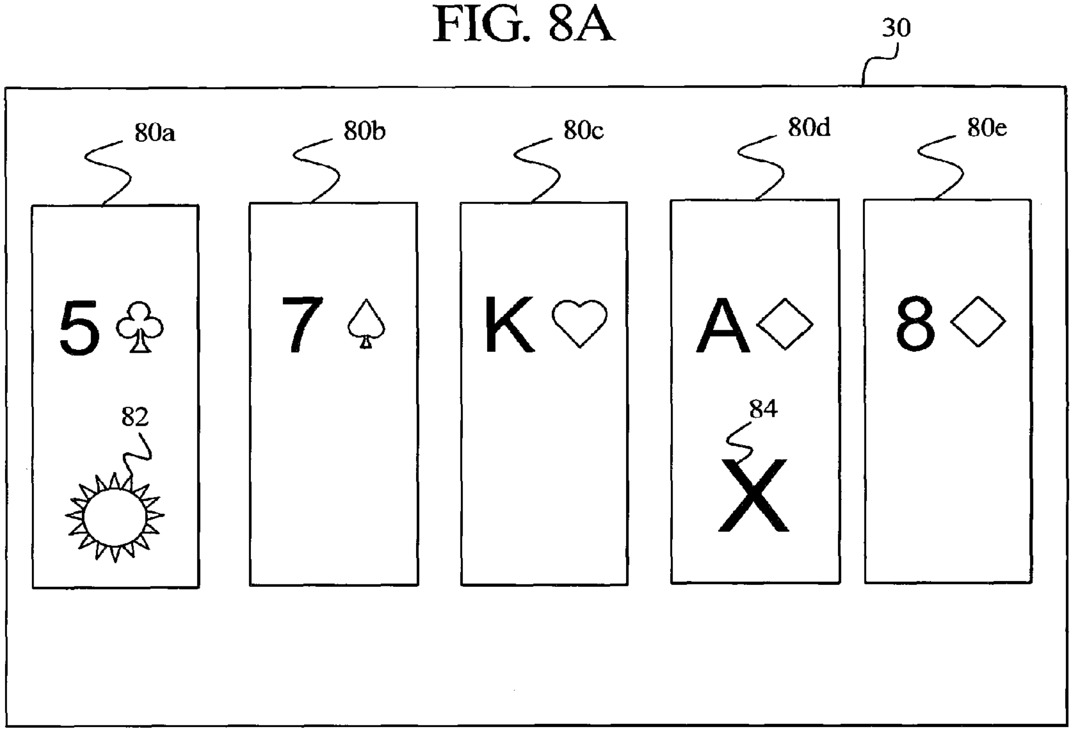
FIGS. 8A, 8B and 8C are front elevation views of a display device displaying a set of cards having a wild activation symbol and a wild termination symbol.
Figure 8B:
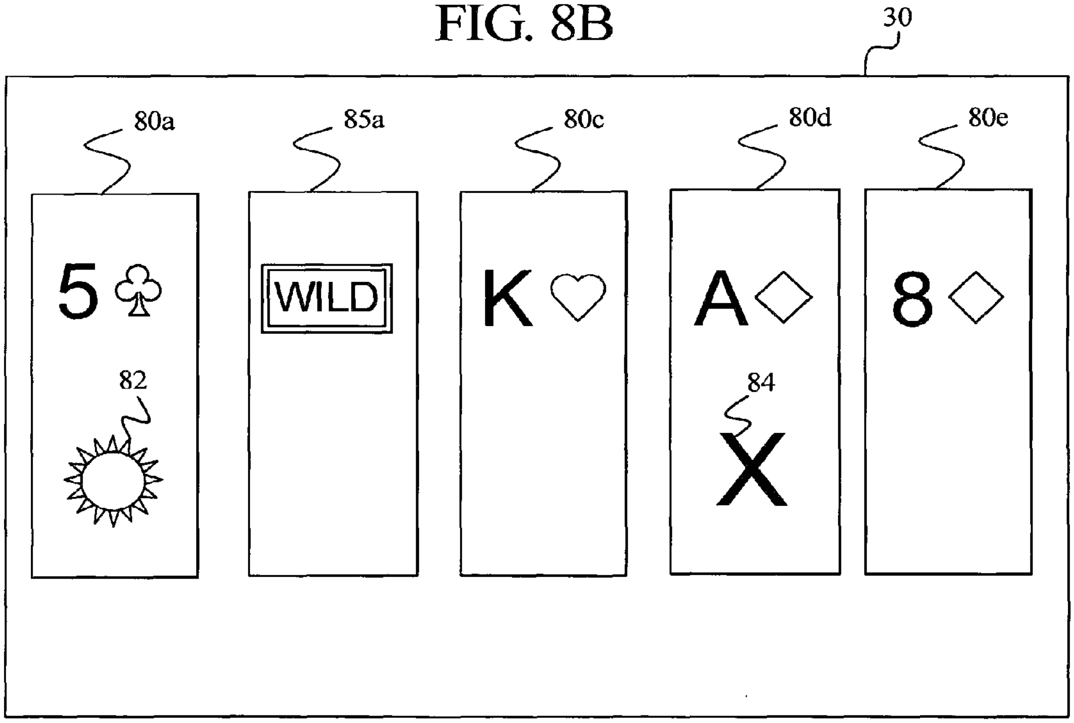
Figure 8C:
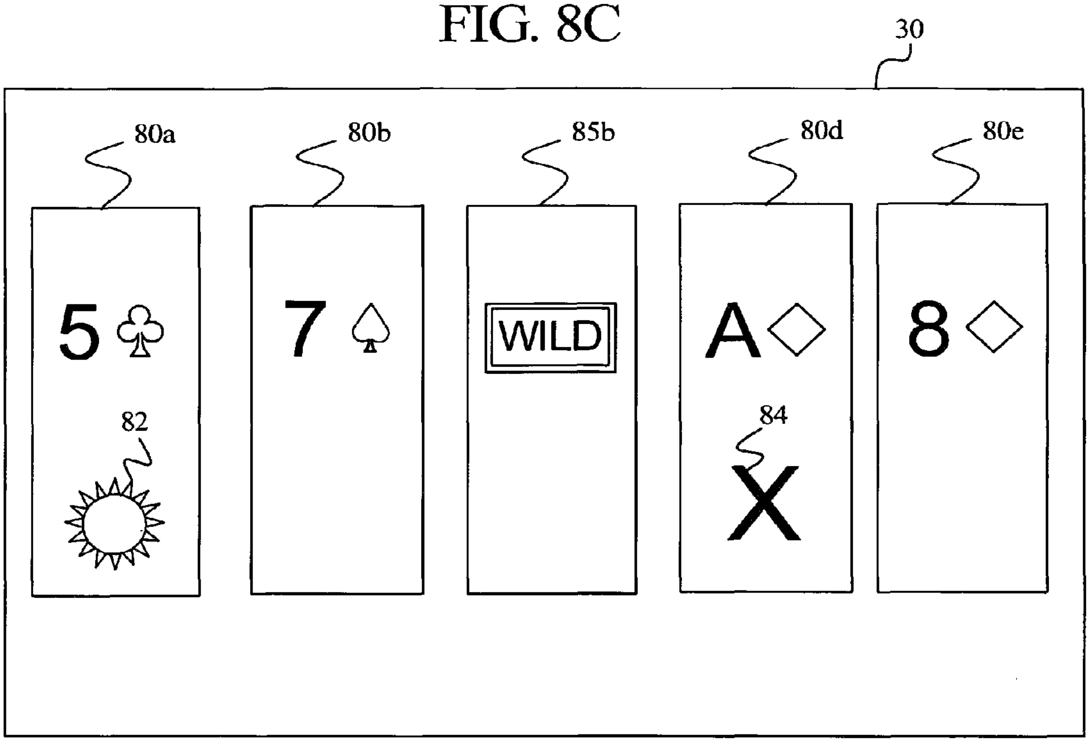

It should be appreciated that the present invention could be employed in other primary or bonus games. For instance, in one embodiment, the display device displays a set of cards in a video poker game. The processor randomly determines which, if any, cards will include a wild activation symbol and a wild termination symbol. For example, referring now to FIG. 8A, five cards 80*a* through 80*e* are displayed within the display device 30. A first card 80*a* displays a wild activation symbol 82. The wild activation symbol may be any symbol suitable for use by a gaming device. The processor causes the second card 80*b* to become a wild card 85*a* as illustrated in FIG. 8B and the processor determines if any award should be provided to the player. That card changes back and the third card 80*c* becomes a wild card 85*b* as illustrated in FIG. 8C.

Figure 9A:
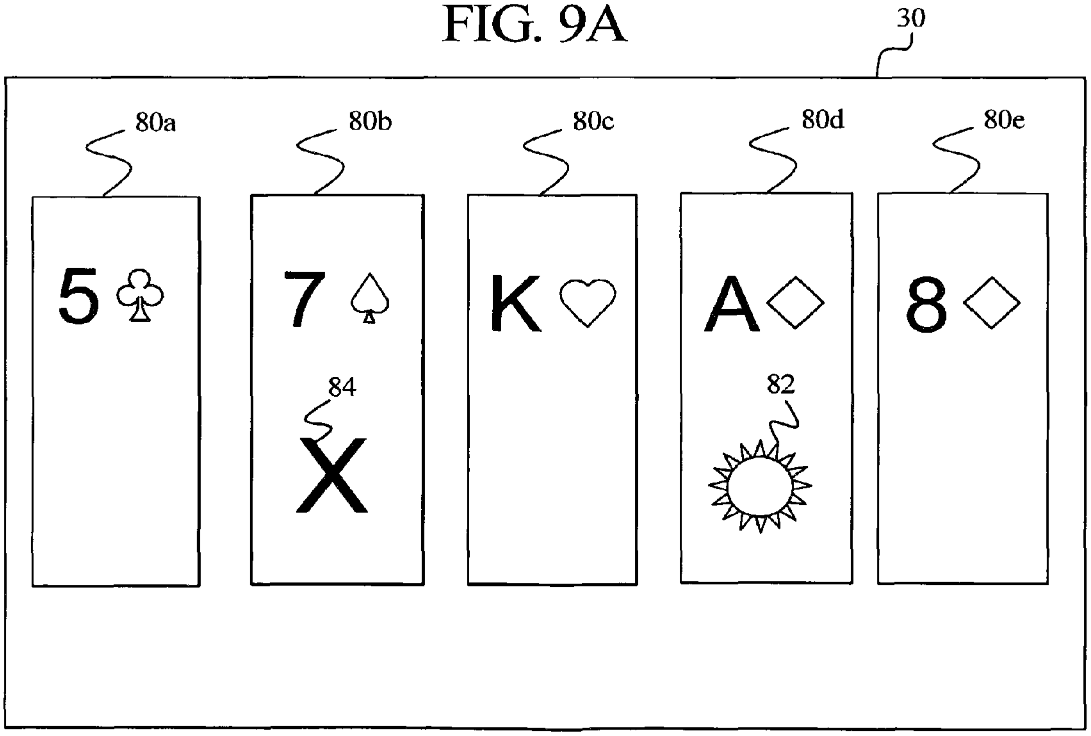
FIGS. 9A, 9B and 9C are front elevation views of a display device displaying a set of cards having a wild activation symbol and a wild termination symbol.
Figure 9B:
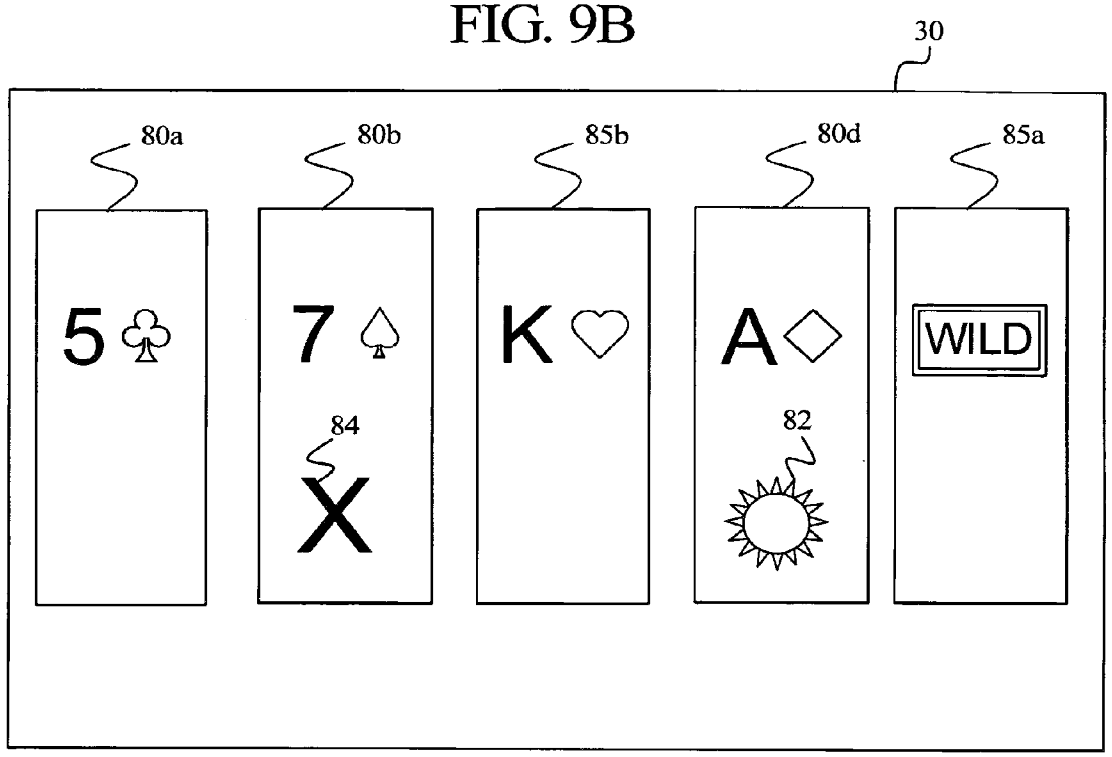
Figure 9C:
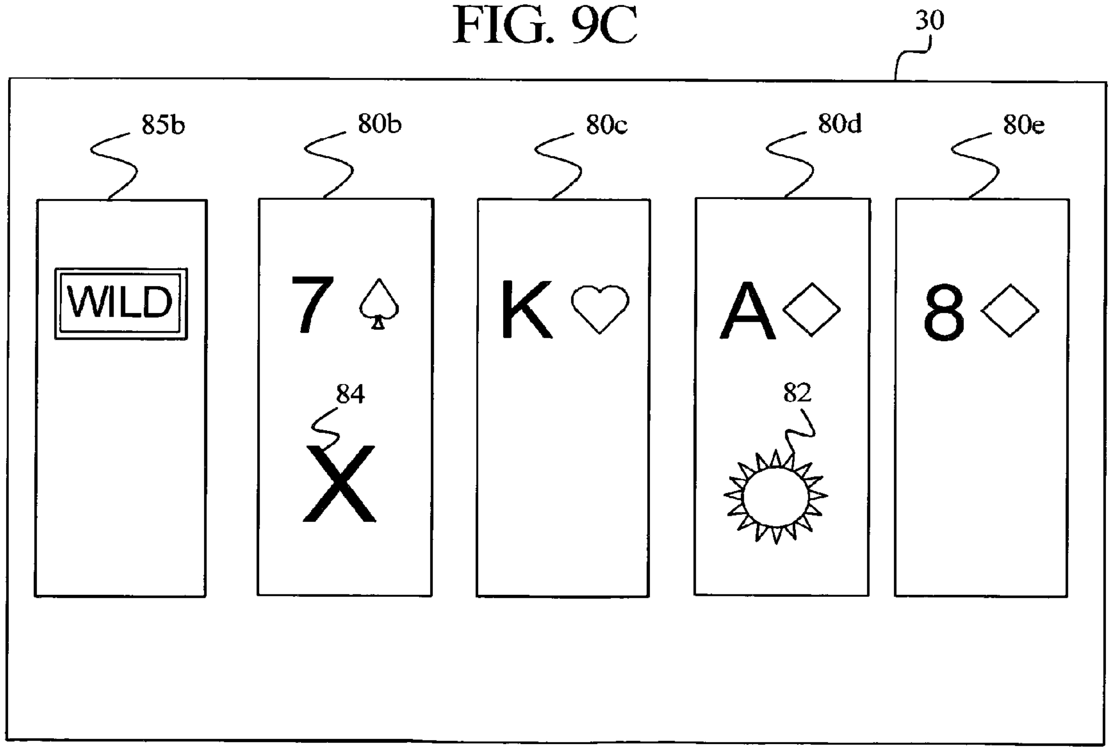

In another example, a fourth card 80*d* in a set of cards displays a wild activation symbol 82 as illustrated in FIG. 9A. The second card 80*b* displays a wild termination symbol 84. The processor causes the fifth card 80*e* to become wild as illustrated in FIG. 9B. Next, the first card 80*a* becomes wild as illustrated in FIG. 9C. The second card 80*b* displays a termination symbol 84. The processor stops any other cards from becoming wild when it reaches the card position displaying the wild termination symbol.

In another embodiment, the processor randomly determines a wild activation position within a set of cards displayed on the display device. The processor causes other cards to become wild in correlation to the wild activation position. A wild termination position is also determined within the set of cards displayed on the display device. The processor stops cards from becoming wild beyond the wild termination position.

Figure 10A:
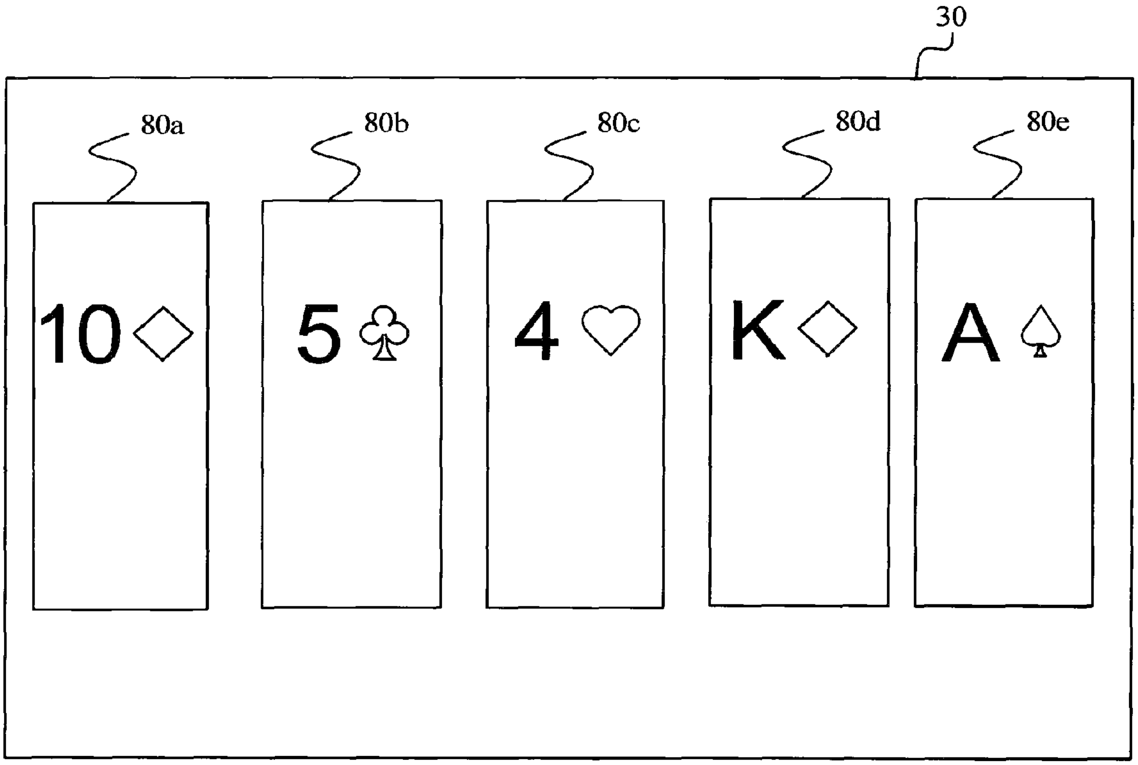
FIGS. 10A, 10B and 10C are front plan views of a display device displaying a set of cards in which a certain card occupies a wild activation position and a certain card occupies a termination position.
Figure 10B:
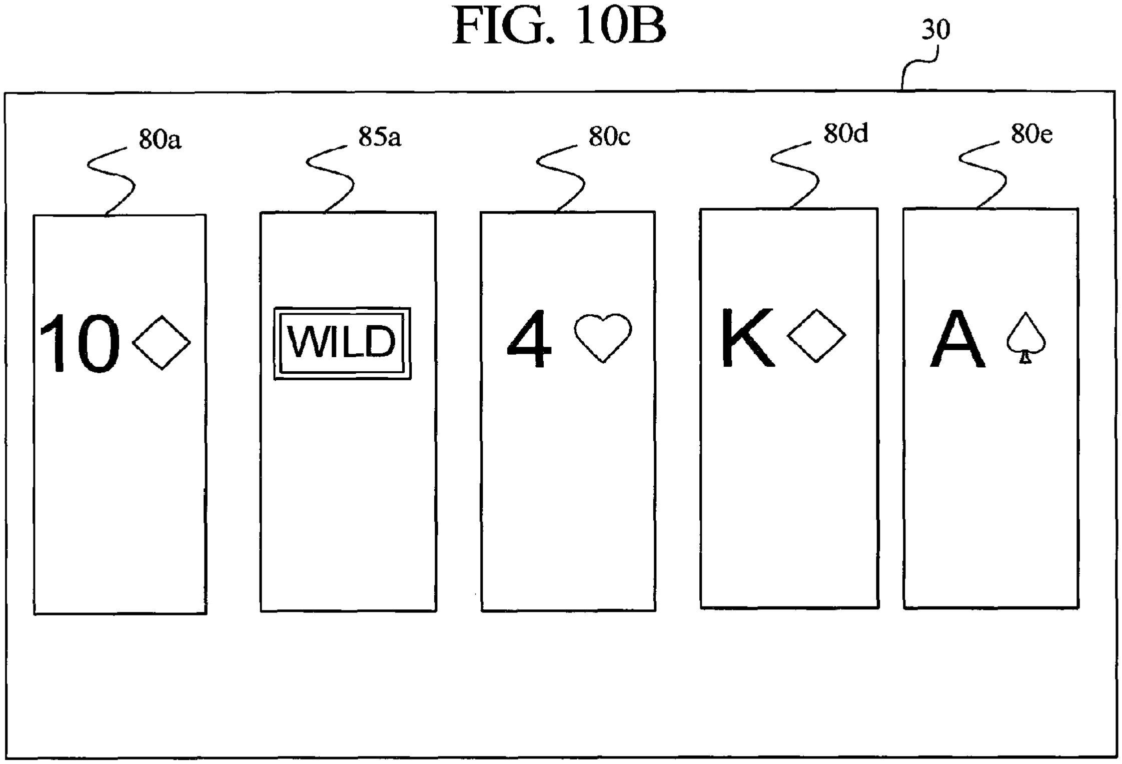
Figure 10C:
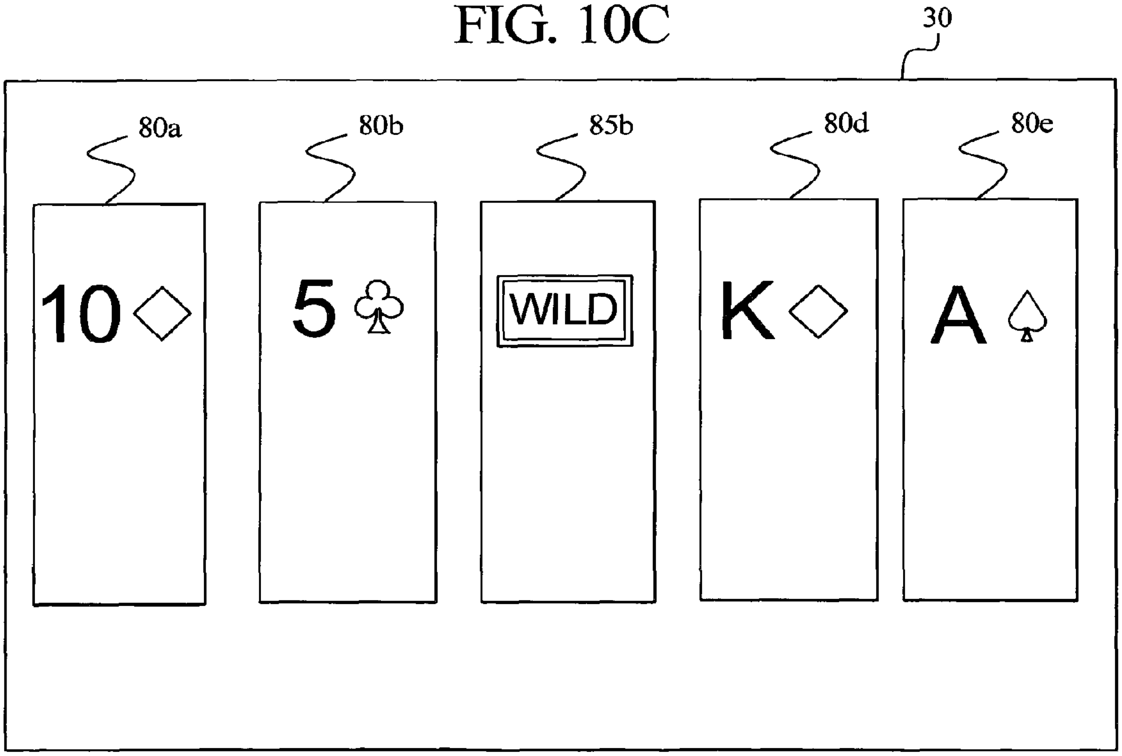

In an example, the display device 30 displays five cards 80*a* through 80*e*, as illustrated in FIG. 10A. Prior to dealing the cards, the processor determines the first card position 80*a* to be the wild activation position. The processor also determines the fourth card position 80*d* to be a wild termination position. The processor then successively transforms the second and third cards into wild cards 85*a* and 85*b*, as illustrated in FIGS. 10B and 10C. The processor prevents any other cards from transforming into wild cards beyond the fourth card position. It should be appreciated that the processor can alternatively transform the cards into wild cards in a random sequence.

In another embodiment, the processor can determine the wild activation position based on a type of card displayed. For example, the processor can determine that the wild activation position will be any position in which a King, if any, is displayed. The processor then determines a wild termination position based on a second type of card. For example, the processor determines that a card displaying a diamond, if any, will correlate to a wild termination position. It is appreciated that the individual determinations of a wild activation position and wild termination position can be dependent or completely independent of each other. For example, the wild activation position may be determined by the suit of the card while the wild termination position may be determined by the numerical value of the card.

It should also be appreciated that the processor could randomly provide a wild termination symbol without a wild activation symbol and vice versa. It should also be appreciated that the player could be allowed or required to hold a wild activation symbol or wild termination symbol.

In one embodiment, the gaming device includes a plurality of symbol generators which include a plurality of symbols. The symbol generators are operable to generate the symbols at a plurality of symbol positions. The symbols include at least one or a plurality of wild activation symbols and at least one or a plurality of wild termination symbols. The gaming device includes at least one or a plurality of paths associated with the symbol generators. In one embodiment, the paths are paylines. Each payline includes a plurality of the symbol positions. When the gaming device generates both a wild activation symbol and a wild termination symbol in the symbol positions of one of the paylines or paths (and that payline or path has been wagered upon and is thus active), the symbols between the wild activation symbol and the wild termination symbol are transformed into wild symbols. In one embodiment, the transformation occurs simultaneously. In one embodiment, the gaming device transforms the symbols along the path or payline into wild symbols only for the evaluation of that payline and then converts the symbols back into the originally generated symbols for the evaluation of any of the other active paylines. In one embodiment, only the symbols along the payline or path that includes the wild activation and wild termination are transformed into wild symbols. In another embodiment, the gaming device evaluates all active paylines with the converted wild symbol or symbols. In one alternative embodiment, the transformation can occur sequentially for each symbol along the designated path or payline and the payline may thus be evaluated more than one time.

Referring now to FIGS. 11A, 11B, 11C, 11D, 11E, 11F and 11G, the gaming device in one embodiment includes a plurality of symbol generators, such as reels, 34*a*, 34*b*, 34*c*, 34*d* and 34*e*. Each of the plurality of reels includes a plurality of symbols and at least one of the symbols is or is adapted to function as a wild activation symbol and at least one of the symbols is or is adapted to function as a wild termination symbol. In one embodiment, when the wild activation symbol and a wild termination symbol are generated on the same wagered on payline, the gaming device changes all of the symbols on the payline between the two wild symbols into wild symbols before it makes the evaluation of that payline.

Figure 11A:
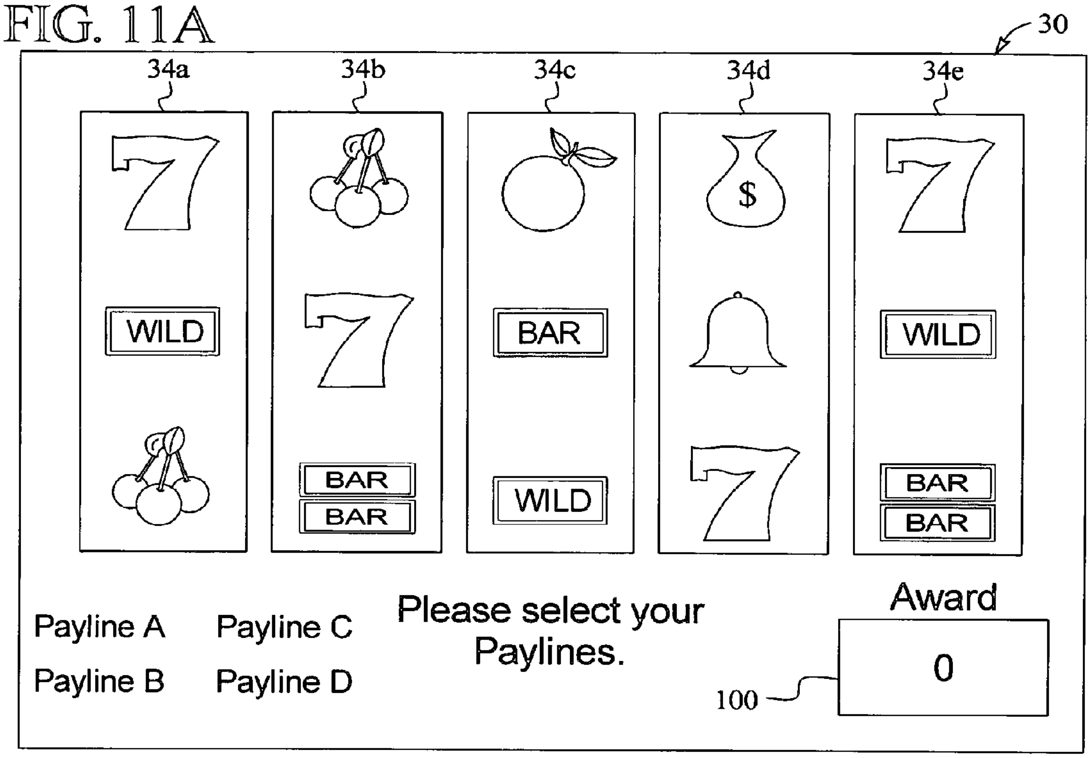
FIGS. 11A, 11B, 11C, 11D, 11E, 11F and 11G are front plan views of a display device displaying a plurality of symbol generators including a plurality symbols and a plurality of paylines, wherein when one of the paylines includes both a wild activation symbol and a wild termination symbol the symbols between the wild symbols are transformed to wild symbols for evaluation of that payline.
Figure 11B:
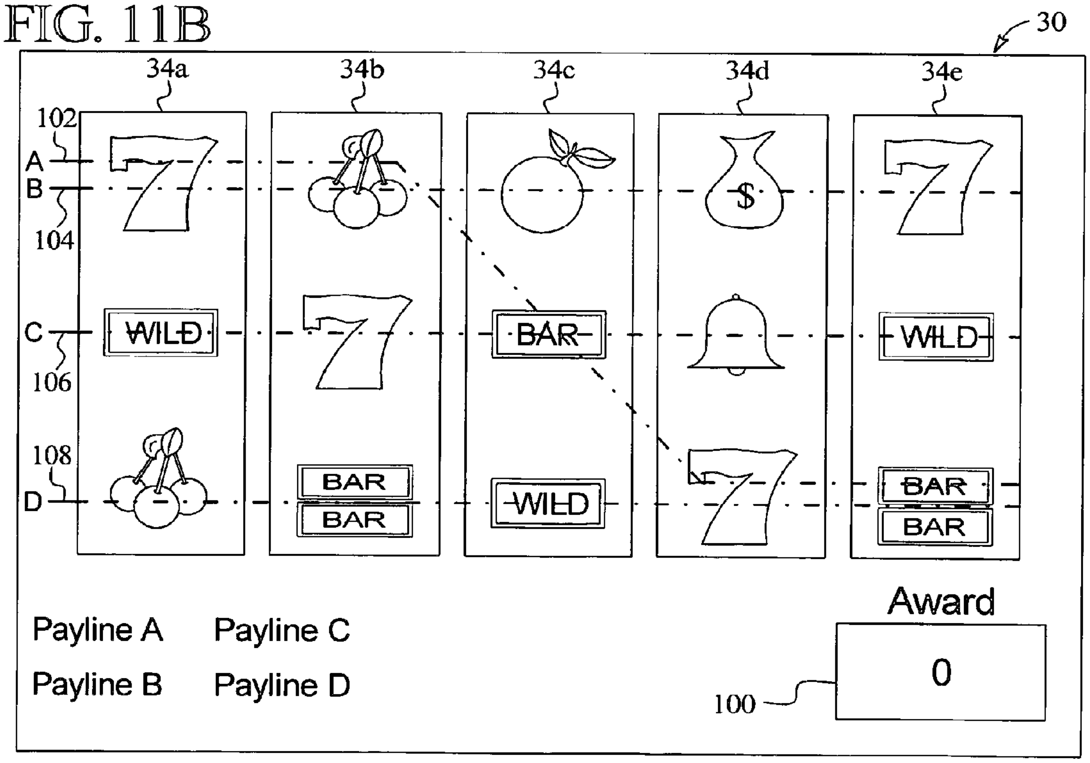
Figure 11C:
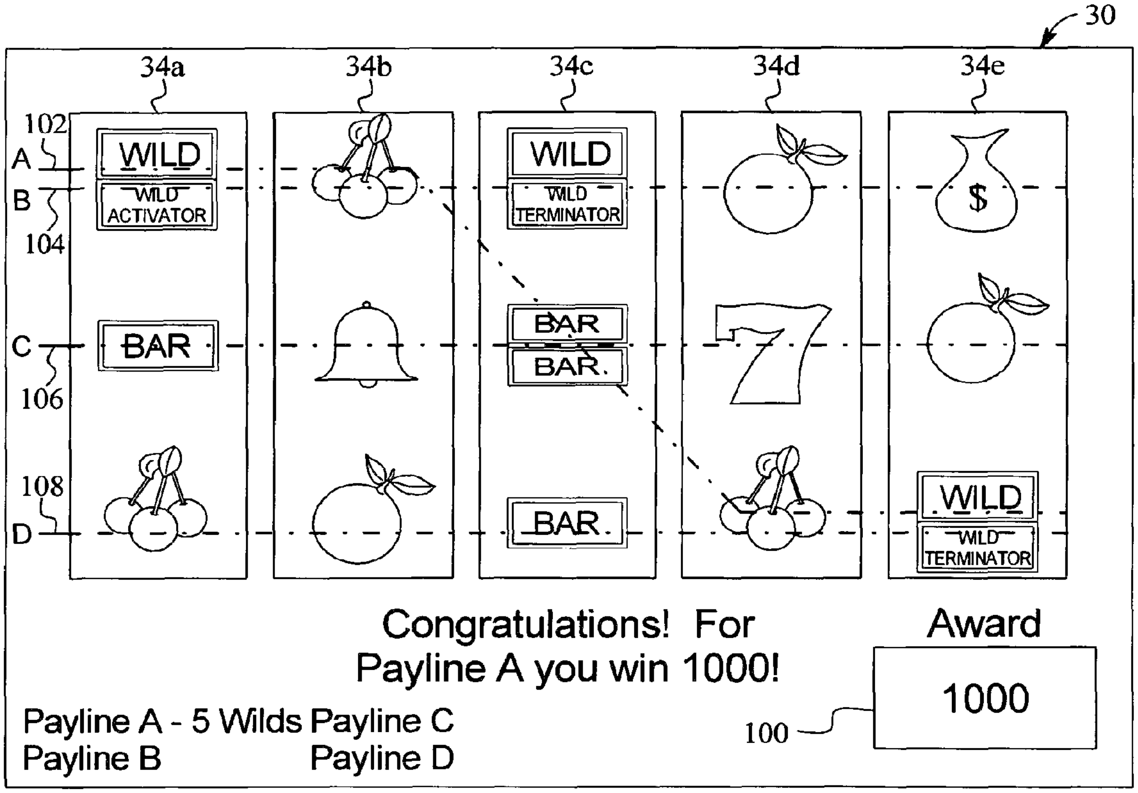

In FIGS. 11A, 11B, 11C, 11D, 11E, 11F and 11G, the gaming device includes a plurality of reels 34*a*, 34*b*, 34*c*, 34*d* and 34*e* and an award display 100. As illustrated in FIG. 11A, the gaming device instructs a player to select one or more of a plurality of paylines to wager on. As illustrated in FIG. 11B, the player selects four paylines: Payline A 102, Payline B 104, Payline C 106 and Payline D 108. Each of these paylines includes five symbol positions. As illustrated in FIG. 11C, the gaming device either automatically or upon player input generates a plurality of symbols at those symbol positions. As illustrated in FIG. 11C, the newly generated symbols include one wild activation symbol and two wild termination symbols. For purposes of illustration, each of the wild activation symbols are labeled wild activator, and each of the wild termination symbols are labeled wild terminator. The top symbol on the first reel 34*a* is a wild activation symbol and the top symbol on the third reel 34*c* and the lower symbol on the fifth reel 34*e* are all wild termination symbols. It should be appreciated that the wild activation symbols and the wild termination symbols may be indicated in any suitable manner.

Figure 11D:
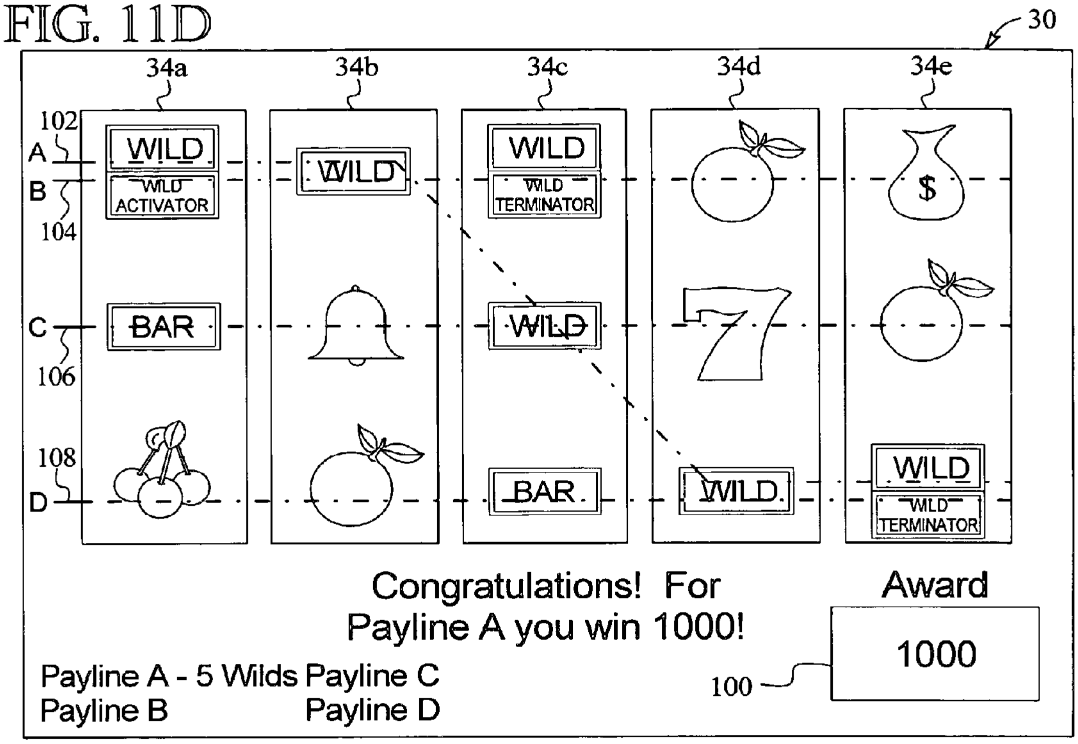

In one embodiment, the gaming device evaluates each payline independently after transforming any symbols along that payline between the wild termination and wild activation symbols into wild symbols. As illustrated in FIG. 11D, the gaming device converts the symbols on Payline A between the two wild symbols into wild symbols. For example, on Payline A, the top symbol on the first reel 34*a* is or functions as a wild activation symbol and the bottom symbol on the fifth reel 34*e* is or functions as a wild termination symbol. The gaming device converts the cherry symbol or the top symbol on the second reel 34*b* into a wild symbol. The gaming device converts the middle symbol on the third reel 34*c* into a wild symbol, and the gaming device converts the bottom symbol on the fourth reel 34*d* into a wild symbol. That is, the gaming device converts all of the symbols between the wild activation and the wild termination symbols into wild symbols. After the conversion of the symbols, the gaming device evaluates Payline A for any winning combinations. As illustrated, in one embodiment, the wild activation symbols and the wild termination symbols also function as wild symbols. In one embodiment, the five wild symbols along a payline results in a large award of 1000 credits. As illustrated in FIG. 11D, the gaming device informs the player "Congratulations! For Payline A you win an award of 1000." The award display 100 displays an award of 1000.

Figure 11E:
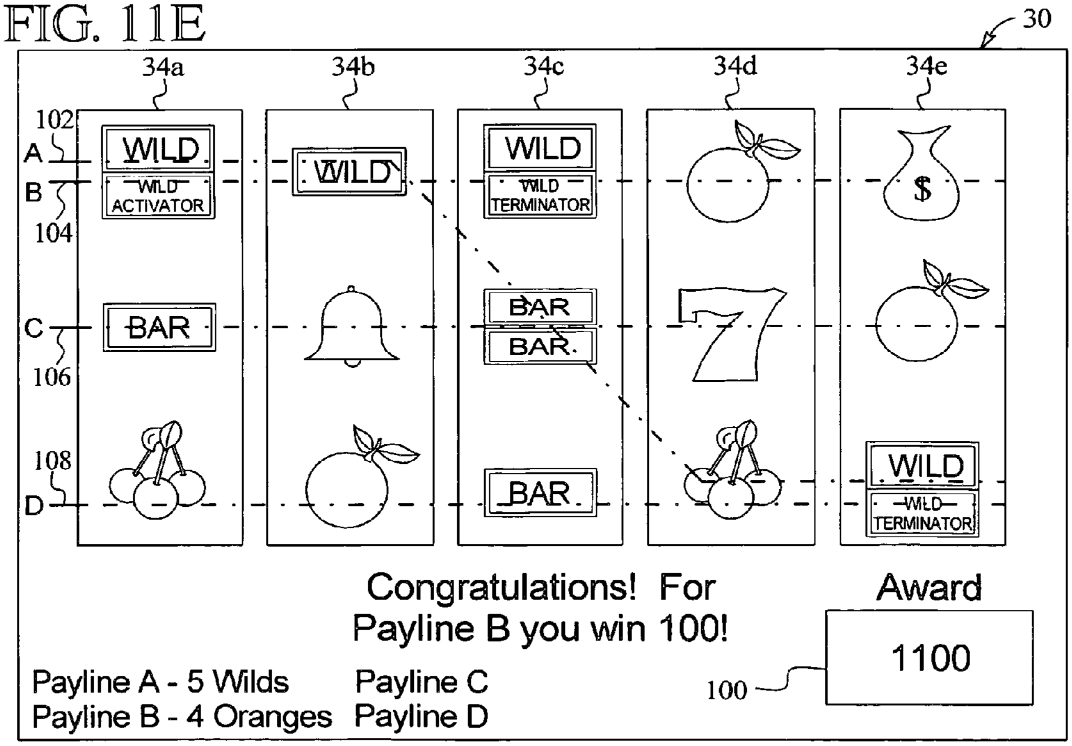

As illustrated in FIG. 11E, the gaming device converts the transformed symbols along Payline A back to the originally generated symbols and converts the symbols along Payline B 104 between the wild activation symbol and the wild termination symbol into wild symbols for the evaluation of Payline B. The top symbol on the first reel 34*a* is a wild activation symbol and the top symbol on the third reel 34*c* is a wild termination symbol. Therefore, the gaming device converts the symbol between the wild activation symbol and the wild termination symbol into a wild symbol. As illustrated in FIG. 11E, the second symbol on the third reel 34*c* has been converted back to a double-bar symbol and the lower symbol on the fourth reel 34*d* has been converted back to the cherry symbol. The gaming device changed the converted symbols on Payline A between the wild activation symbol and the wild termination symbol into wild symbols and evaluated Payline A. The gaming device transformed the symbols back to the originally generated symbols for the purposes of evaluation of the other paylines. However, the top symbol on the second reel 34*b* remained a wild symbol because this symbol is between the wild activation symbol and the wild termination symbol of Payline B. Payline B includes a wild activation symbol in top symbol position of the first reel 34*a*, and a termination wild symbol in the top symbol position on the third reel 34*c*. As illustrated in FIG. 11E, the gaming device converts the top symbol on the second reel 34*b* into a wild symbol. The gaming device recognizes a win of four oranges, as illustrated in FIG. 11E. In one embodiment, for a symbol combination of four oranges, the player wins 100 credits. Therefore, the gaming device communicates to the player "Congratulations for Payline B you win 100." The award display 100 shows an award value of 1100 credits.

Figure 11F:
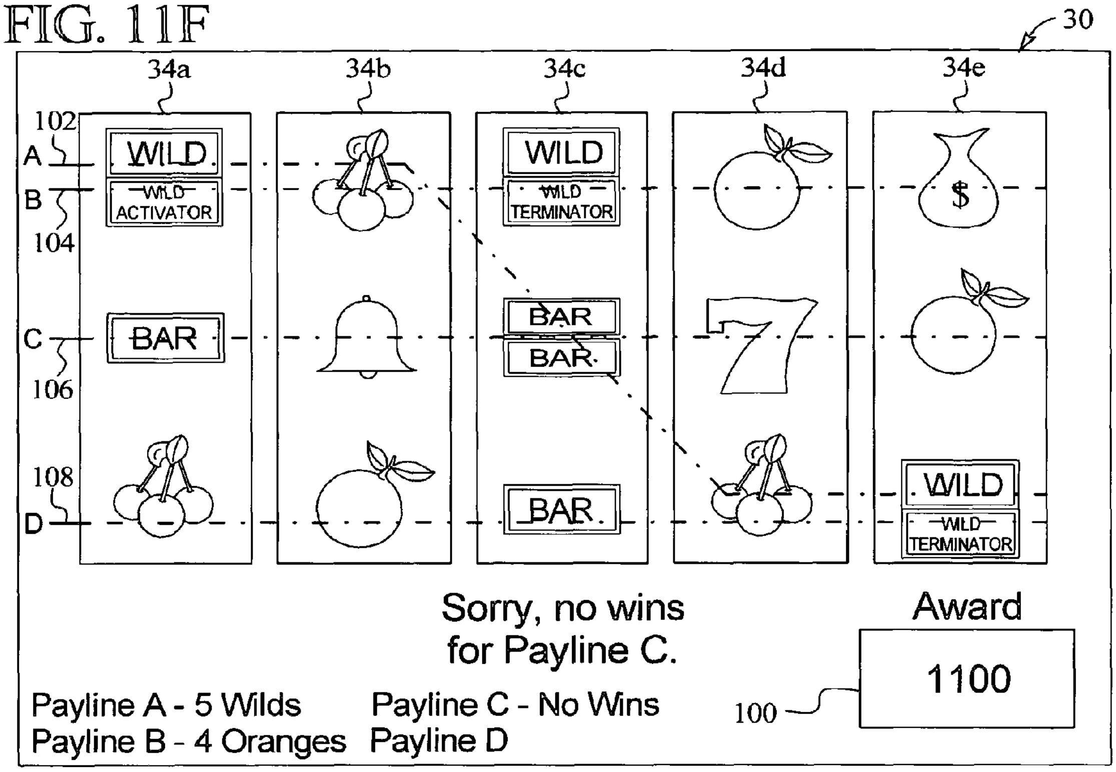

As illustrated in FIG. 11F, the gaming device transforms or changes the first symbol on the second reel 34*b* back to the cherry symbol and evaluates Payline C 106. As illustrated in FIG. 11F, Payline C does not include any wild symbols. That is, Payline C does not include a wild activation symbol or a wild termination symbol. Therefore, the gaming device evaluates Payline C without changing or transforming any symbols. The gaming device communicates to the player "Sorry no wins on Payline C" and the award display 100 continues to display an award value of 1100 credits.

Figure 11G:
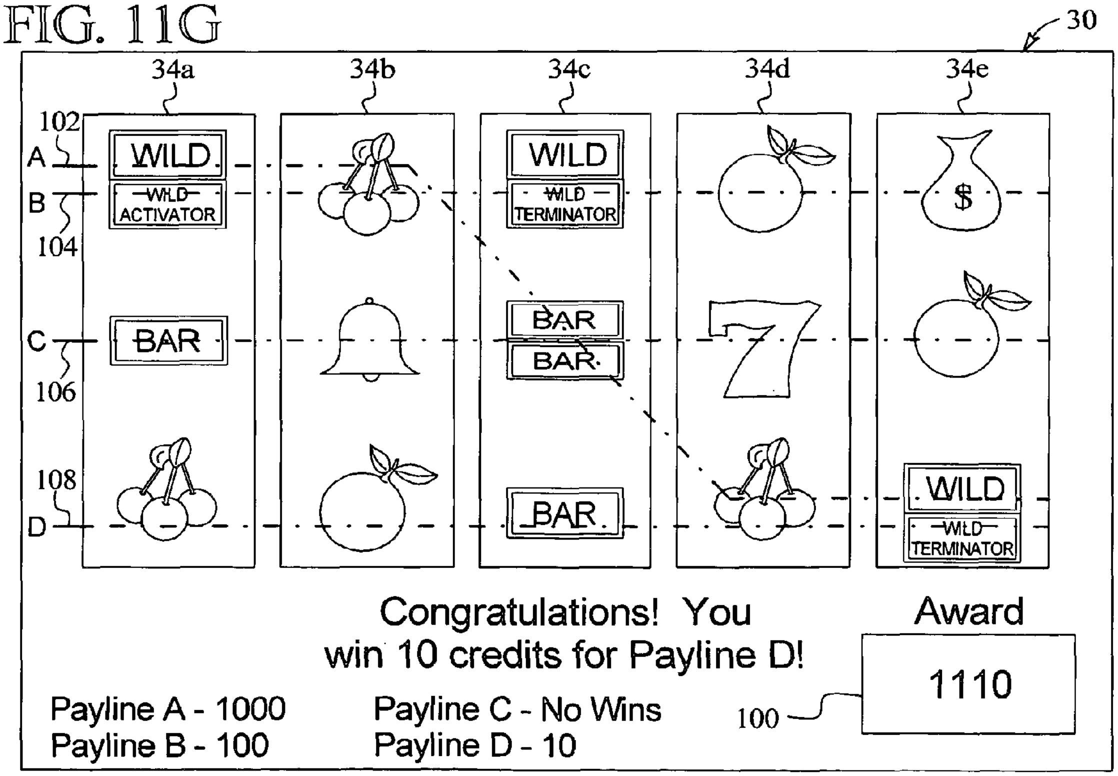

As illustrated in FIG. 11G, the gaming device evaluates Payline D 108. Payline D 108 includes only a wild termination symbol. Payline D does not include both a wild activation symbol and a wild termination symbol. The gaming device does not convert any symbols because the payline does not include both a wild activation symbol and a wild termination symbol. The gaming device evaluates Payline D without converting any symbols and awards the player 10 credits for the two cherries in a row as the wild symbol is evaluated as a cherry in Payline D. The gaming device provides the player with an overall award of 1110, as illustrated in the award display 100.

In another embodiment, the gaming device includes a plurality of symbol generators which include a plurality of paths which are paylines. In one embodiment, when a payline includes a wild activation symbol and a wild termination symbol, the gaming device transforms or changes all of the symbols between the wild activation symbol and the wild termination symbol into wild symbols. In this embodiment, the gaming device evaluates each payline for any winning combinations before changing or transforming the symbols back into their original symbol. That is, the gaming device does not transform all of the symbols back into the originally generated symbols after evaluating that payline.

Figure 12A:
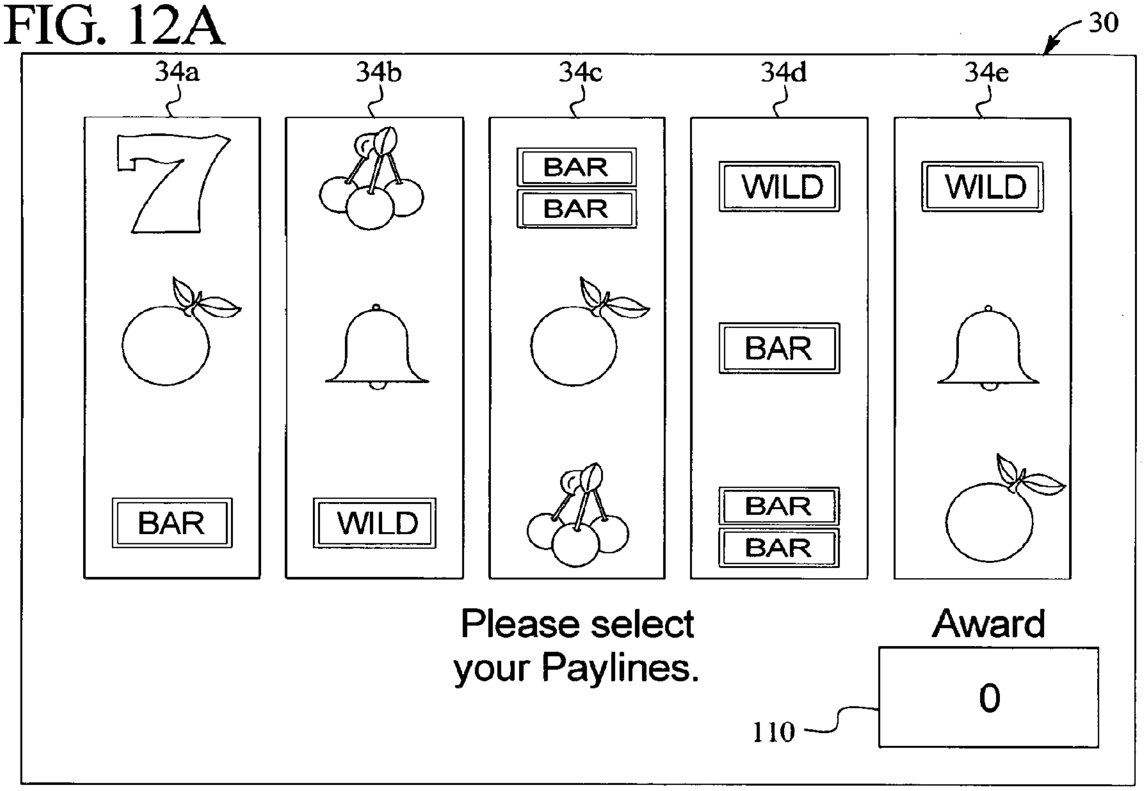
FIGS. 12A, 12B, 12C and 12D are front plan views of a display device displaying a plurality of symbol generators including a plurality of symbols and a plurality of paylines, wherein when one of the paylines includes a wild activation symbol and a wild termination symbol the symbols between the wild symbols are transformed to wild symbols for evaluation of each of the paylines.

More specifically, as illustrated in FIGS. 12A, 12B, 12C and 12D, a gaming device includes a plurality of symbol generators such as reels, 34*a*, 34*b*, 34*c*, 34*d*, 34*e*, and 34*f*. Each of the symbol generators includes a plurality of symbols and a plurality of paths. The gaming device includes an award display 110. As illustrated in FIG. 12A, the gaming device instructs a player to select or wager on one or a plurality of paylines. In one embodiment, the paylines define the paths and each payline includes a plurality of symbol positions.

Figure 12B:
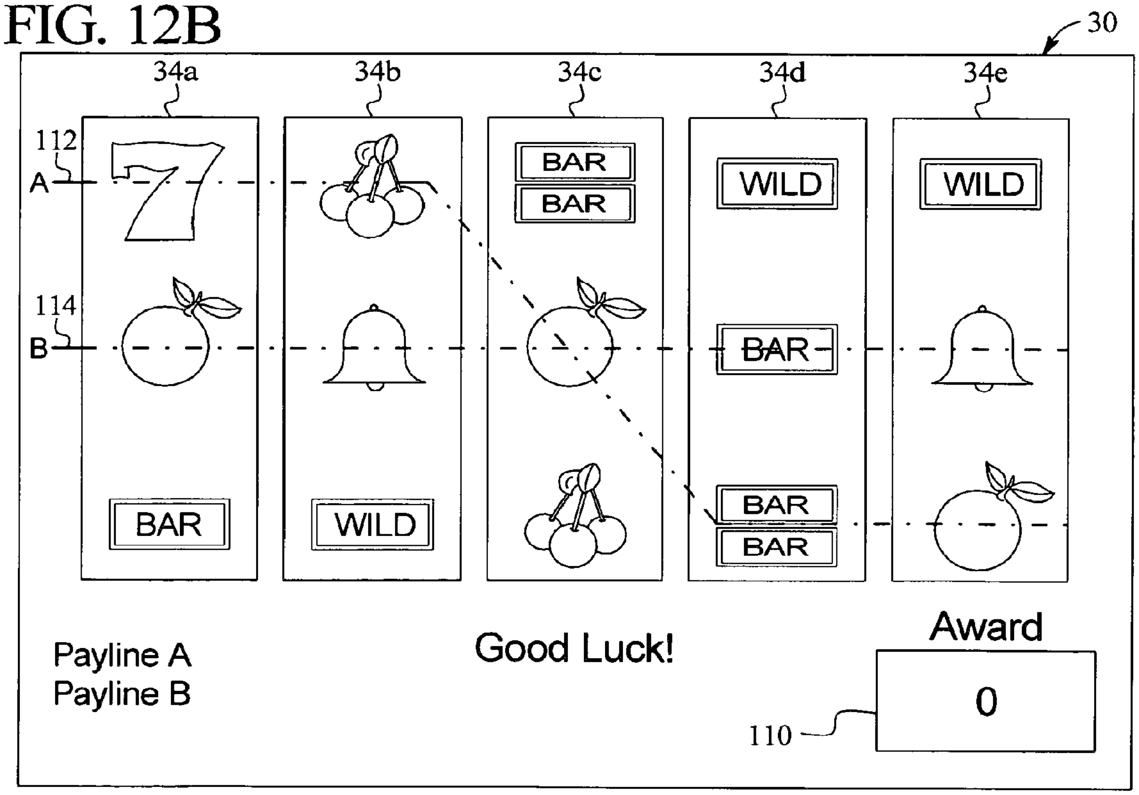
Figure 12C:
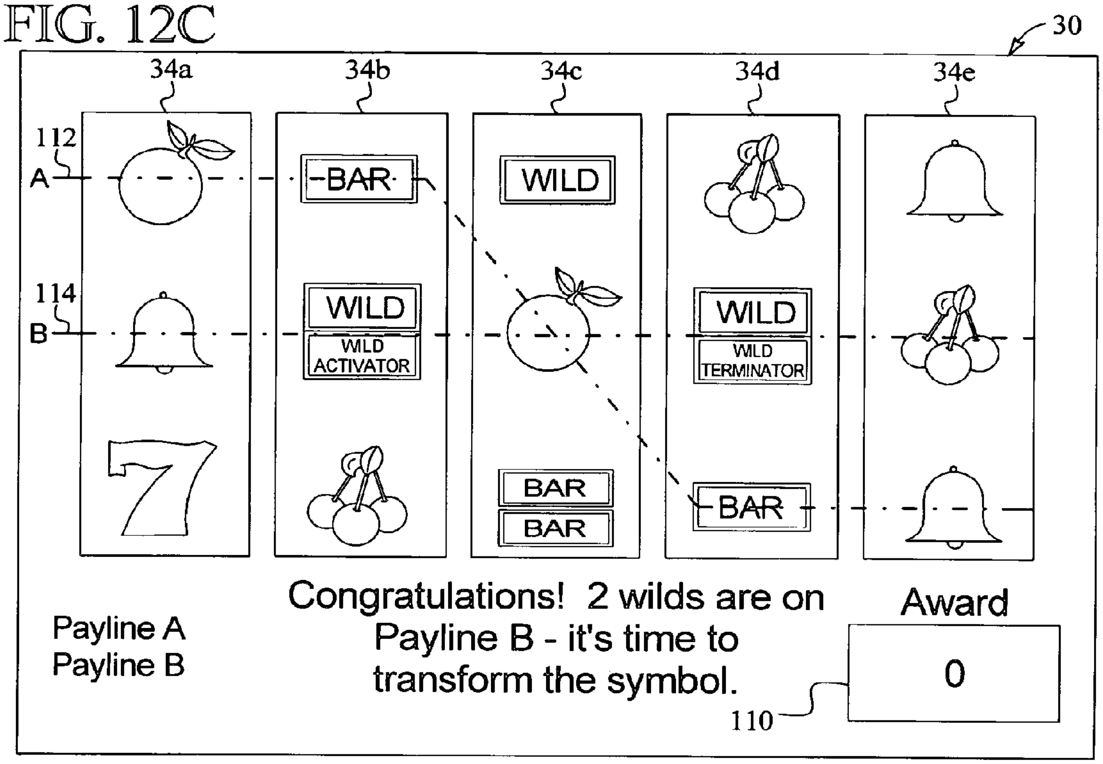
Figure 12D:
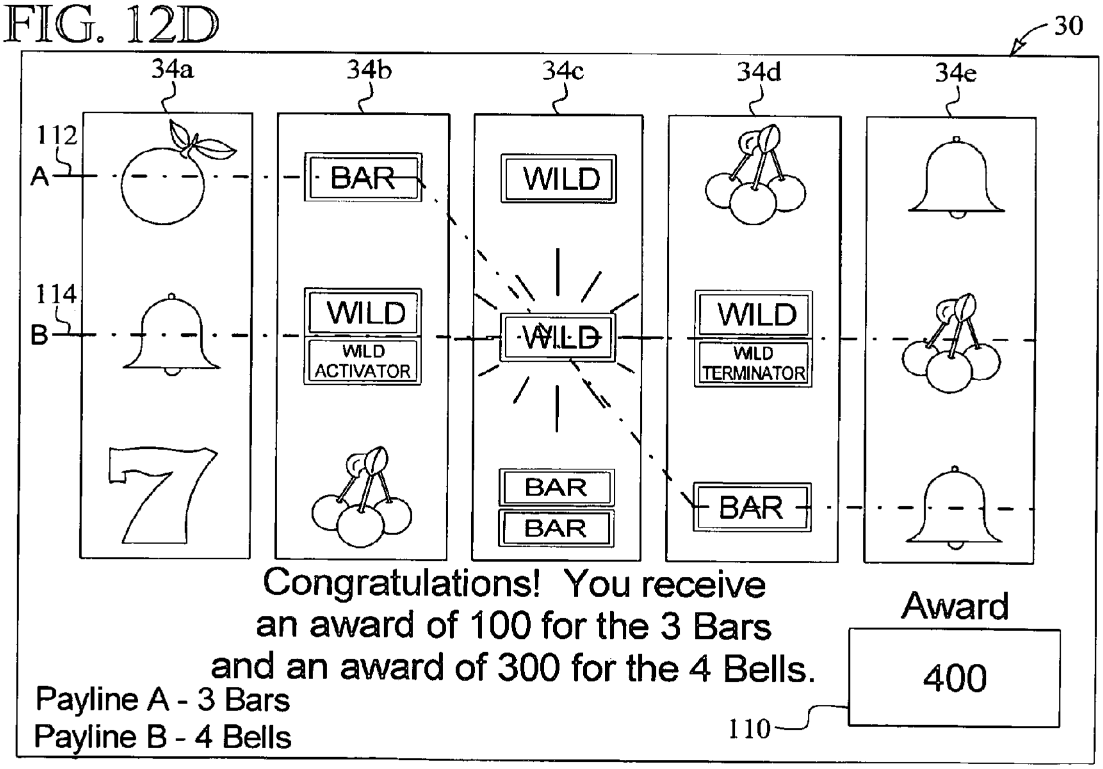

As illustrated in FIG. 12B, the player selects two paylines: Payline A 112 and Payline B 114. As illustrated in FIG. 12C, the gaming device generates a plurality of symbols either automatically or upon a player input. The gaming device converts any wild symbols on Payline A and Payline B between a wild activation and a wild termination symbol into wild symbols. As illustrated in FIG. 12C, Payline A does not include any wild symbols and Payline B includes two wild symbols. Payline B 114 includes a wild activation symbol on middle of the second reel 34*b* and includes a wild termination symbol on middle of the fourth reel 34*d*. Therefore, the gaming device converts the symbol between the wild activation symbol and the wild termination symbol, the middle symbol on the third reel 34*c*, into a wild symbol, as illustrated in FIG. 12D. The gaming device then evaluates Payline A 112 and Payline B 114 for any winning symbol combinations with the transformed symbol. The gaming device evaluates Payline A and the gaming device determines a winning symbol combination of 3 bars which in one embodiment is worth 100 credits. The gaming device evaluates Payline B 114 for a symbol combination of 3 wilds, which in one embodiment is worth a value of 300 credits. The gaming device awards the player a total of 400 credits.

It should be appreciated that the gaming device in one embodiment converts all the converted symbols back to the original symbols after each payline evaluation. It should be appreciated that any suitable type of payline may be included in this embodiment. In another embodiment, the gaming device changes the newly transformed wild symbol into a different symbol than the symbol originally generated. It should be appreciated that any suitable number of reels and any suitable number of symbol positions may be associated with the paylines. In one embodiment, the wild activation and the wild termination symbols are the same symbol. In another embodiment, the wild activation and the wild termination symbols are different symbols. In one embodiment, one or more designated symbols are operable to function as the wild activation symbol and one or more certain symbols are operable to function as the wild termination symbol. In this embodiment, the gaming device converts the operable symbols to wild activation symbols and wild termination symbols when both of the operable symbols are generated on a payline or a path. The wild activation symbol and the wild termination symbol can be any symbol and function as any suitable symbol. In one embodiment, the occurrence of a wild activation and a wild termination symbol along the same path qualifies the player for a non-monetary award such as a free game or extra game time. In one embodiment, the gaming device includes a plurality of paths or paylines and the gaming device only evaluates and converts the symbols on one, more or all of the paylines. It should be appreciated that the gaming device may convert symbols on less than all of the total number of paths or paylines. It should also be appreciated that the wild activation and the wild termination symbol may be located at any symbol position of the path or payline. That is, the wild activation and the wild termination symbol could be one or more symbols apart and cause one or my symbols to convert to wild symbols for the evaluation of that path or payline.

In an alternative embodiment, rather than determining any outcome to provide to the player by analyzing the symbols generated on any wagered upon paths or paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, the gaming device enables a player to wager on a number of ways to win and based on the wagered on number of ways to win, the gaming device activates a certain number of symbol positions. That is, in this embodiment, if a winning symbol combination is generated on the reels in activated symbol positions, the gaming device provides the player one award for that occurrence of the generated winning symbol combination. For example, if one winning symbol combination is generated on the reels in active symbol locations, the gaming device will provide a single award to the player for that winning symbol combination (i.e., not based on paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device more ways to win for an equivalent bet or wager on a traditional slot gaming device with paylines. In one embodiment, certain wagerable amounts correspond to certain numbers of ways to win. For example, a wager of $3 corresponds to 3 ways to win and a wager of $4 corresponds to 5 ways to win. A certain number of symbol positions are activated based on the wagered on number of ways to win.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win. It should be appreciated that the gaming device activates a certain number of the symbols based on the wagered on ways to win. In the above example of a three reel gaming device with three symbols generated includes a possible 27 ways to win (i.e., 3 symbols on the first reel×3 symbols on the second reel×3 symbols on the third reel). Therefore, if a player wagers on three ways, the gaming device can activate 3 symbols on one of the reels, and 1 symbol on each of the other reels (3×1×1=3 ways to win).

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment where a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, if active symbol positions include a wild activation symbol and a wild termination symbol, the gaming device classifies the wild activation symbol and the wild termination symbol as a string of related symbols because they form part of a winning combination. In one embodiment, the gaming device changes or transforms all of the symbols in between the wild activation symbol and the wild termination symbol into wild symbols. For example, in a five reel gaming device, for the first reel all three symbol positions are active, on the second reel all three symbol positions are active, on the third reel all three symbol positions are active, on the fourth reel only the middle symbol positions is active and on the fifth reel the middle and the bottom symbol positions are active. The gaming device generates a wild activation symbol in the middle symbol position on the second reel and a wild termination on the lowest symbol position on the fifth reel. Therefore, the gaming device determines a string or path of the active symbols in between the wild activation symbol and the wild termination symbol. The gaming device changes any of the symbols in the active symbol positions of the third reel to a wild symbol and changes the symbol in the one active symbol position on the fourth reel into wild symbols. The gaming device evaluates the path or string for any winning combinations and provides an award to the player.

In one alternative embodiment, the present disclosure is employed in accordance with a cascading symbol slot machine which randomly provides and displays a plurality of symbols that are positioned into pre-defined positions on the display. In one such embodiment, the symbols are displayed on an upper portion of the display, and each symbol is re-positioned or falls into a randomly determined column in a matrix of columns and rows. The symbols fill columns beginning with the bottom row or the lowest vacant position within that column. After a predetermined number of symbols have fallen into the columns, the gaming machine determines if a winning combination occurs along one or more paylines associated with the rows and columns. In one embodiment, the gaming machine eliminates the symbols in the winning combination and provides an award to the player for that combination. The gaming machine randomly provides additional symbols that are displayed and subsequently fall into the bottom row or the lowest vacant row within the columns, including the positions vacated by the eliminated symbols. This cascading effect continues with winning combinations being replaced and awards for winning combinations being provided until a winning combination is no longer formed in the matrix.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A method of operating a gaming system, said method comprising:

(a) receiving, via an acceptor, a first physical item associated with a first monetary value;

(b) identifying, via a validator, the received first physical item;

(c) establishing, via at least one processor, a credit balance based at least in part on the first monetary value of the received first physical item;

(d) receiving, via a wager button, a wager on a play of a game associated with a plurality of symbols, said wager having a wager amount;

(e) deducting, via the at least one processor, the wager amount from the credit balance;

(f) for said play of the game:

(i) randomly generating, via the at least one processor, a plurality of the plurality of symbols;

(ii) displaying, via the at least one display device, the randomly generated symbols;

(iii) if a triggering event occurs and if a plurality of instances of a designated non-wild symbol are displayed: (A) for each displayed instance of the designated non-wild symbol, replacing, via the at least one processor, said displayed instance of said designated non-wild symbol with the wild symbol and displaying, via the at least one display device, said wild symbol; (B) determining, via the at least one processor, any awards based on the displayed symbols; and (C) adding, via the at least one processor, an amount of each determined award to the credit balance; and (iv) if the triggering event does not occur, determining, via the at least one processor, any awards based on the displayed symbols and adding, via the at least one processor, an amount of each determined award to the credit balance; and (g) if an actuation of a cashout button is received, initiating, via the at least one processor, a payout associated with the credit balance.

2. The method of claim 1, wherein the first physical item is one of a ticket and currency.

3. The method of claim 1, which includes, if the actuation of the cashout button is received, printing, via a printer, a ticket redeemable for a monetary value of the credit balance.

4. The method of claim 1, which includes, if the triggering event occurs, for each displayed instance of a second designated non-wild symbol, replacing, via the at least one processor, said displayed instance of said second designated non-wild symbol with the wild symbol and displaying, via the at least one display device, said wild symbol.

5. The method of claim 4, wherein said replacing of any displayed instances of said second designated non-wild symbol with the wild symbol occurs after (f)(iii)(B) and which includes, after replacing any displayed instances of said second designated non-wild symbol with the wild symbol, determining, via the at least one processor, any awards based on the displayed symbols and adding, via the at least one processor, an amount of each determined award to the credit balance.

6. The method of claim 4, wherein said replacing of any displayed instances of said second designated non-wild symbol with the wild symbol occurs before (f)(iii)(B).

7. The method of claim 1, wherein the triggering event randomly occurs.

8. The method of claim 1, wherein the triggering event occurs based on the displayed symbols.

9. The method of claim 8, wherein the triggering event occurs when a wild activation symbol is included among the displayed symbols.

10. The method of claim 9, wherein the wild activation symbol is predetermined.

11. The method of claim 8, wherein the triggering event occurs when at least one instance of the designated symbol is included among the displayed symbols.

* * * * *